(12) United States Patent
Higgins et al.

(10) Patent No.: US 7,893,944 B2
(45) Date of Patent: Feb. 22, 2011

(54) GAMUT MAPPING AND SUBPIXEL RENDERING SYSTEMS AND METHODS

(75) Inventors: Michael Francis Higgins, Cazadero, CA (US); Anthony Botzas, San Jose, CA (US); Candice Hellen Brown Elliott, Santa Rosa, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/090,353

(22) PCT Filed: Oct. 13, 2006

(86) PCT No.: PCT/US2006/040272
§ 371 (c)(1),
(2), (4) Date: Oct. 7, 2008

(87) PCT Pub. No.: WO2007/047537
PCT Pub. Date: Apr. 26, 2007

(65) Prior Publication Data
US 2009/0122073 A1    May 14, 2009

Related U.S. Application Data

(60) Provisional application No. 60/726,979, filed on Oct. 14, 2005, provisional application No. 60/828,088, filed on Oct. 4, 2006.

(51) Int. Cl.
*G09G 5/00* (2006.01)
*G09G 5/02* (2006.01)
*G06K 9/40* (2006.01)
*G06K 9/32* (2006.01)
*G06K 9/00* (2006.01)
*H04N 1/46* (2006.01)

(52) U.S. Cl. .............. 345/581; 345/589; 345/591; 345/586; 345/613; 358/518; 358/520; 358/523; 358/525; 382/162; 382/167; 382/254; 382/274

(58) Field of Classification Search ............. 345/427, 345/581, 590–591, 588, 600–601, 604, 606, 345/613, 629, 630, 639, 643, 22, 48, 87, 345/88, 690, 204, 67; 358/518, 520, 523, 358/525; 382/162, 167, 166, 254, 274, 276, 382/299–300
See application file for complete search history.

(56) References Cited

U.S. PATENT DOCUMENTS 6,100,861 A    8/2000    Cohen et al.

(Continued)

FOREIGN PATENT DOCUMENTS

| EP | 0782124 A1 | 7/1997 |
|---|---|---|
| JP | 2005-156925 | 6/2005 |
| JP | 2006-221007 | 8/2006 |

*Primary Examiner*—Wesner Sajous
(74) *Attorney, Agent, or Firm*—Innovation Counsel LLP

(57) ABSTRACT

In a first embodiment, a display system comprises a display panel with 4 or more colored subpixels. The display system receives input image data specified in a first color space and outputs image data specified in a second color space. The display system further comprises a gamut mapping module for mapping the input image data specified in the first color space to image data specified in the second color space. The gamut mapping module clamps out-of-gamut colors using at least a first clamping system and a second clamping system. The first and second clamping systems yield first and second clamped values. A weighting module produces a resulting clamped value from the first and second clamped values. A final output image value is derived from the resulting clamped value. Other embodiments of the display system include pre-reduction modules and adjustable GMA modules.

25 Claims, 15 Drawing Sheets

U.S. PATENT DOCUMENTS

| | | | |
|---|---|---|---|
| 6,570,579 B1 * | 5/2003 | MacInnis et al. | 345/629 |
| 7,110,006 B2 * | 9/2006 | MacInnis et al. | 345/629 |
| 7,248,268 B2 * | 7/2007 | Brown Elliott et al. | 345/613 |
| 7,667,715 B2 * | 2/2010 | MacInnis et al. | 345/629 |
| 2003/0085906 A1 | 5/2003 | Elliott et al. | |
| 2005/0040756 A1 | 2/2005 | Winters et al. | |
| 2005/0083344 A1 * | 4/2005 | Higgins | 345/600 |
| 2008/0030518 A1 * | 2/2008 | Higgins et al. | 345/589 |
| 2009/0058873 A1 * | 3/2009 | Brown Elliott et al. | 345/589 |
| 2009/0273614 A1 * | 11/2009 | Higgins et al. | 345/690 |

* cited by examiner

GAMUT MAPPING AND SUBPIXEL RENDERING SYSTEMS AND METHODS

CROSS REFERENCE TO RELATED APPLICATIONS

This application claims the benefit of U.S. Provisional Application 60/726,979 filed on. Oct. 14, 2005, and U.S. Provisional Application 60/828,088, filed on Oct. 4, 2006, both entitled IMPROVED GAMUT MAPPING AND SUB-PIXEL RENDERING SYSTEMS AND METHODS, and which are both hereby incorporated by reference herein in their entirety.

TECHNICAL FIELD

The present application relates to image display systems and image processing methods that perform gamut mapping and subpixel rendering operations.

BACKGROUND

Novel sub-pixel arrangements are disclosed for improving the cost/performance curves for image display devices in the following commonly owned United States patents and patent applications including: (1) U.S. Pat. No. 6,903,754 ("the '754 patent") entitled "ARRANGEMENT OF COLOR PIXELS FOR FULL COLOR IMAGING DEVICES WITH SIMPLIFIED ADDRESSING;" (2) United States Patent Publication No. 2003/0128225 ("the '225 application") having application Ser. No. 10/278,353 and entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) United States Patent Publication No. 2003/0128179 ("the '179 application") having application Ser. No. 10/278,352 and entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) United States Patent Publication No. 2004/0051724 ("the '724 application") having application Ser. No. 10/243,094 and entitled "IMPROVED FOUR COLOR ARRANGEMENTS AND EMITTERS FOR SUB-PIXEL RENDERING," filed Sep. 13, 2002; (5) United States Patent Publication No. 2003/0117423 ("the '423 application") having application Ser. No. 10/278,328 and entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) United States Patent Publication No. 2003/0090581 ("the '581 application") having application Ser. No. 10/278,393 and entitled "COLOR DISPLAY HAVING HORIZONTAL SUB-PIXEL ARRANGEMENTS AND LAYOUTS," filed Oct. 22, 2002; and (7) United States Patent Publication No. 2004/0080479 ("the '479 application") having application Ser. No. 10/347,001 and entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003. Each of the aforementioned '225, '179, '724, '423, '581, and '479 published applications and U.S. Pat. No. 6,903,754 are hereby incorporated by reference herein in its entirety.

For certain subpixel repeating groups having an even number of subpixels in a horizontal direction, systems and techniques to affect improvements, e.g. polarity inversion schemes and other improvements, are disclosed in the following commonly owned United States patent documents: (1) United States Patent Publication No. 2004/0246280 ("the '280 application") having application Ser. No. 10/456,839 and entitled "IMAGE DEGRADATION CORRECTION IN NOVEL LIQUID CRYSTAL DISPLAYS"; (2) United States Patent Publication No. 2004/0246213 ("the '213 application") (U.S. patent application Ser. No. 10/455,925) entitled "DISPLAY PANEL HAVING CROSSOVER CONNECTIONS EFFECTING DOT INVERSION"; (3) United States Patent Publication No. 2004/0246381 ("the '381 application") having application Ser. No. 10/455,931 and entitled "SYSTEM AND METHOD OF PERFORMING DOT INVERSION WITH STANDARD DRIVERS AND BACKPLANE ON NOVEL DISPLAY PANEL LAYOUTS"; (4) United States Patent Publication No. 2004/0246278 ("the '278 application") having application Ser. No. 10/455,927 and entitled "SYSTEM AND METHOD FOR COMPENSATING FOR VISUAL EFFECTS UPON PANELS HAVING FIXED PATTERN NOISE WITH REDUCED QUANTIZATION ERROR"; (5) United States Patent Publication No. 2004/0246279 ("the '279 application") having application Ser. No. 10/456,806 entitled "DOT INVERSION ON NOVEL DISPLAY PANEL LAYOUTS WITH EXTRA DRIVERS"; (6) United States Patent Publication No. 2004/0246404 ("the '404 application") having application Ser. No. 10/456,838 and entitled "LIQUID CRYSTAL DISPLAY BACKPLANE LAYOUTS AND ADDRESSING FOR NON-STANDARD SUBPIXEL ARRANGEMENTS"; (7) United States Patent Publication No. 2005/0083277 ("the '277 application") having application Ser. No. 10/696,236 entitled "IMAGE DEGRADATION CORRECTION IN NOVEL LIQUID CRYSTAL DISPLAYS WITH SPLIT BLUE SUBPIXELS", filed Oct. 28, 2003; and (8) United States Patent Publication No. 2005/0212741 ("the '741 application") having application Ser. No. 10/807,604 and entitled "IMPROVED TRANSISTOR BACKPLANES FOR LIQUID CRYSTAL DISPLAYS COMPRISING DIFFERENT SIZED SUBPIXELS", filed Mar. 23, 2004. Each of the aforementioned '280, '213, '381, '278, '404, '277 and '741 published applications are hereby incorporated by reference herein in its entirety.

These improvements are particularly pronounced when coupled with sub-pixel rendering (SPR) systems and methods further disclosed in the above-referenced U.S. Patent documents and in commonly owned United States patents and patent applications: (1) United States Patent Publication No. 2003/0034992 ("the '992 application") having application Ser. No. 10/051,612 and entitled "CONVERSION OF A SUB-PIXEL FORMAT DATA TO ANOTHER SUB-PIXEL DATA FORMAT," filed Jan. 16, 2002; (2) United States Patent Publication No. 2003/0103058 ("the '058 application") having application Ser. No. 10/150,355 entitled "METHODS AND SYSTEMS FOR SUB-PIXEL RENDERING WITH GAMMA ADJUSTMENT," filed May 17, 2002; (3) United States Patent Publication No. 2003/0085906 ("the '906 application") having application Ser. No. 10/215,843 and entitled "METHODS AND SYSTEMS FOR SUB-PIXEL RENDERING WITH ADAPTIVE FILTERING," filed Aug. 8, 2002; (4) United States Publication No. 2004/0196302 ("the '302 application") having application Ser. No. 10/379,767 and entitled "SYSTEMS AND METHODS FOR TEMPORAL SUB-PIXEL RENDERING OF IMAGE DATA" filed Mar. 4, 2003; (5) United States Patent Publication No. 2004/0174380 ("the '380 application") having application Ser. No. 10/379,765 and entitled "SYSTEMS AND METHODS FOR MOTION ADAPTIVE FILTERING," filed Mar. 4, 2003; (6) U.S. Pat. No. 6,917,368 ("the '368 patent") entitled "SUB-PIXEL RENDERING SYSTEM AND METHOD FOR IMPROVED DISPLAY VIEWING ANGLES"; and (7) United States Patent Publication No. 2004/0196297 ("the '297 application") having application Ser. No. 10/409,413 and entitled "IMAGE DATA SET WITH EMBEDDED PRE-SUBPIXEL RENDERED IMAGE" filed Apr. 7, 2003. Each of the aforementioned '992, '058, '906, '302, 380 and '297 applications and the '368 patent are hereby incorporated by reference herein in its entirety.

Improvements in gamut conversion and mapping are disclosed in commonly owned United States patents and co-pending United States Patent applications: (1) U.S. Pat. No. 6,980,219 ("the '219 patent") entitled "HUE ANGLE CALCULATION SYSTEM AND METHODS"; (2) United States Patent Publication No. 2005/0083341 ("the '341 application") having application Ser. No. 10/691,377 and entitled "METHOD AND APPARATUS FOR CONVERTING FROM SOURCE COLOR SPACE TO TARGET COLOR SPACE", filed Oct. 21, 2003; (3) United States Patent Publication No. 2005/0083352 ("the '352 application") having application Ser. No. 10/691,396 and entitled "METHOD AND APPARATUS FOR CONVERTING FROM A SOURCE COLOR SPACE TO A TARGET COLOR SPACE", filed Oct. 21, 2003; and (4) United States Patent Publication No. 2005/0083344 ("the '344 application") having application Ser. No. 10/690,716 and entitled "GAMUT CONVERSION SYSTEM AND METHODS" filed Oct. 21, 2003. Each of the aforementioned '341, '352 and '344 applications and the '219 patent is hereby incorporated by reference herein in its entirety.

Additional advantages have been described in (1) United States Patent Publication No. 2005/0099540 ("the '540 application") having application Ser. No. 10/696,235 and entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003; and in (2) United States Patent Publication No. 2005/0088385 ("the '385 application") having application Ser. No. 10/696,026 and entitled "SYSTEM AND METHOD FOR PERFORMING IMAGE RECONSTRUCTION AND SUBPIXEL RENDERING TO EFFECT SCALING FOR MULTI-MODE DISPLAY" filed Oct. 28, 2003, each of which is hereby incorporated herein by reference in its entirety.

Additionally, each of these co-owned and co-pending applications is herein incorporated by reference in its entirety: (1) United States Patent Publication No. 2005/0225548 ("the '548 application") having application Ser. No. 10/821,387 and entitled "SYSTEM AND METHOD FOR IMPROVING SUB-PIXEL RENDERING OF IMAGE DATA IN NON-STRIPED DISPLAY SYSTEMS"; (2) United States Patent Publication No. 2005/0225561 ("the '561 application") having application Ser. No. 10/821,386 and entitled "SYSTEMS AND METHODS FOR SELECTING A WHITE POINT FOR IMAGE DISPLAYS"; (3) United States Patent Publication No. 2005/0225574 ("the '574 application") and United States Patent Publication No. 2005/0225575 ("the '575 application") having application Ser. Nos. 10/821,353 and 10/961,506 respectively, and both entitled "NOVEL SUBPIXEL LAYOUTS AND ARRANGEMENTS FOR HIGH BRIGHTNESS DISPLAYS"; (4) United States Patent Publication No. 2005/0225562 ("the '562 application") having application Ser. No. 10/821,306 and entitled "SYSTEMS AND METHODS FOR IMPROVED GAMUT MAPPING FROM ONE IMAGE DATA SET TO ANOTHER"; (5) United States Patent Publication No. 2005/0225563 ("the '563 application") having application Ser. No. 10/821,388 and entitled "IMPROVED SUBPIXEL RENDERING FILTERS FOR HIGH BRIGHTNESS SUBPIXEL LAYOUTS"; and (6) United States Patent Publication No. 2005/0276502 ("the '502 application") having application Ser. No. 10/866,447 and entitled "INCREASING GAMMA ACCURACY IN QUANTIZED DISPLAY SYSTEMS."

Additional improvements to, and embodiments of, display systems and methods of operation thereof are described in: (1) Patent Cooperation Treaty (PCT) Application No. PCT/US 06/12768, entitled "EFFICIENT MEMORY STRUCTURE FOR DISPLAY SYSTEM WITH NOVEL SUBPIXEL STRUCTURES" filed Apr. 4, 2006, and published in the United States as United States Patent Application Publication 2008/0170083; (2) Patent Cooperation Treaty (PCT) Application No. PCT/US 06/12766, entitled "SYSTEMS AND METHODS FOR IMPLEMENTING LOW-COST GAMUT MAPPING ALGORITHMS" filed Apr. 4, 2006, and published in the United States as United States Patent Application Publication 2008/0150958; (3) U.S. patent application Ser. No. 11/278,675, entitled "SYSTEMS AND METHODS FOR IMPLEMENTING IMPROVED GAMUT MAPPING ALGORITHMS" filed Apr. 4, 2006, and published as United States Patent Application Publication 2006/0244686; (4) Patent Cooperation Treaty (PCT) Application No. PCT/US 06/12521, entitled "PRE-SUBPIXEL RENDERED IMAGE PROCESSING IN DISPLAY SYSTEMS" filed Apr. 4, 2006, and published in the United States as United States Patent Application Publication 2008/0186325; and (5) Patent Cooperation Treaty (PCT) Application No. PCT/US2006/019657, entitled "MULTIPRIMARY COLOR SUBPIXEL RENDERING WITH METAMERIC FILTERING" filed on May 19, 2006 and published in the United States as United States Patent Application Publication 2009/0058873 (referred to below as the "Metamer Filtering application".) Each of these co-owned applications is also herein incorporated by their references in their entireties.

DISCLOSURE OF THE INVENTION

Technical Effect: The various embodiments of the display systems illustrated and described below have the technical effect of improving the operation of a gamut mapping module that maps input image data specified in a first color space to mapped color values specified in a second color space defined by the primary colors of the display system. The mapped color values are input to a subpixel rendering operation which produces output image data for display.

A display system comprises a display panel substantially comprising a subpixel repeating group with at least four primary colored subpixels. The display system receives input image data specified in a first color space and outputs image data specified in a second color space. The display system comprises a gamut mapping module configured to map the input image data specified in the first color space to image data specified in the second color space. The gamut mapping module clamps out-of-gamut colors to black. The display system further comprises a calculation unit configured to calculate at least a first primary color value in the second color space depending upon the luminance of the out-of-gamut image data.

In a second embodiment, a display system comprises a display panel substantially comprising a subpixel repeating group with at least four primary colored subpixels. The display system receives input image data specified in a first color space and outputs image data specified in a second color space. The display system comprises a gamut mapping module configured to map the input image data specified in the first color space to an image color value specified in the second color space. The gamut mapping module clamps out-of-gamut colors using at least first and second clamping systems. The first and second clamping systems yield first and second clamped values. The display system further comprises a weighting module that produces a resulting clamped value from the first and said second clamped values, wherein a final output image value is derived from the resulting clamped value.

In another embodiment, a display system is configured to receive input image data specified in a first color space and to output image data specified in a second color space. The display system comprises a display panel substantially comprising a subpixel repeating group with at least four primary colored subpixels that define the second color space. The display system further comprises a pre-reduction module configured to reduce the values of the input image data, and a gamut mapping module that accepts the reduced input image data values.

In another embodiment, a display system is configured to receive input image data specified in a first color space and configured to output image data specified in a second color space. The display system comprises a display panel comprising a subpixel repeating group and an adjustable gamut mapping module that inputs parameters based upon an arrangement of said subpixels in said subpixel repeating group.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

MODES FOR CARRYING OUT THE INVENTION

Figure 1:
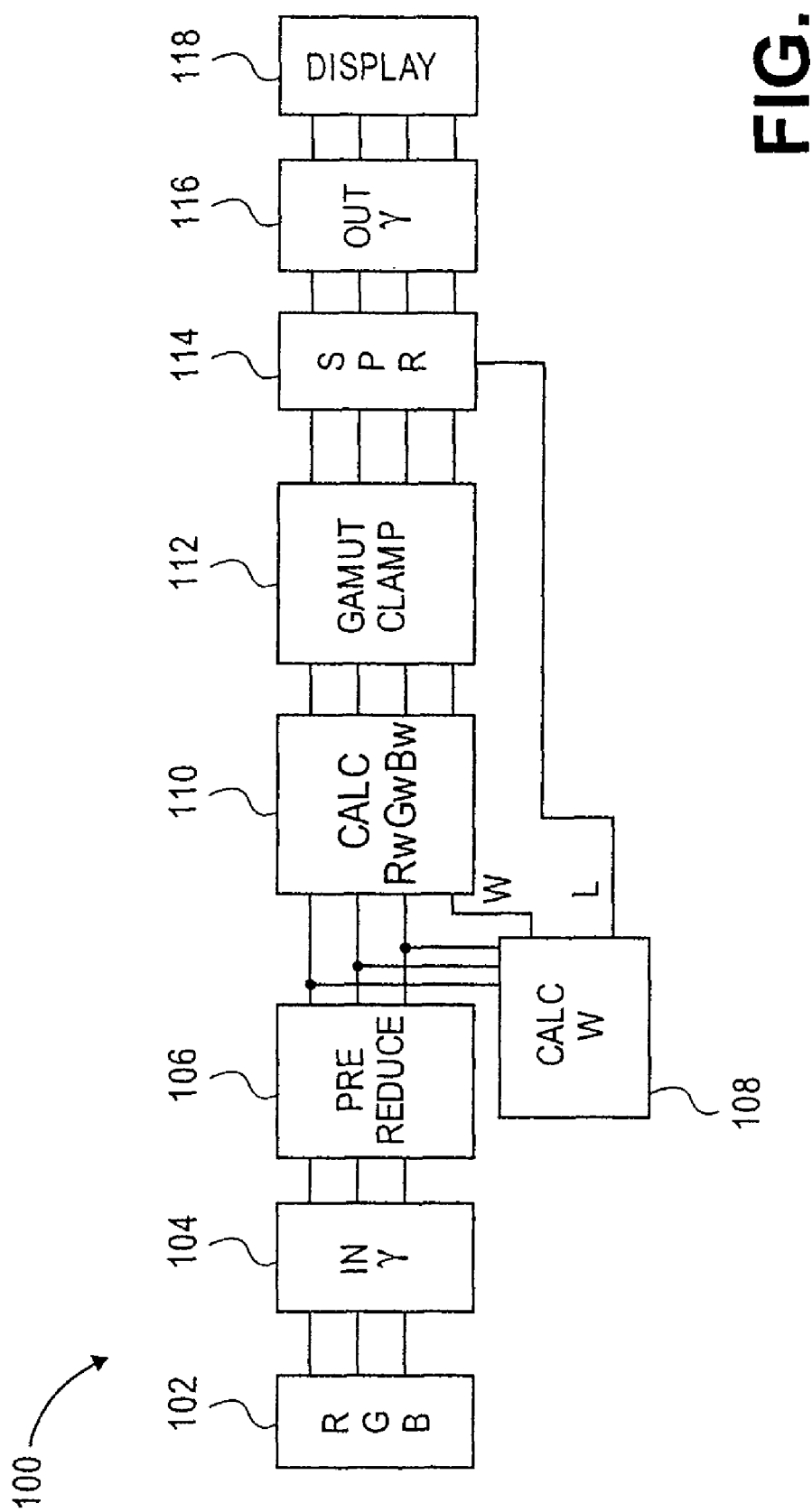
FIG. 1 is a simplified block diagram of one possible embodiment of an image processing system that incorporates aspects of the present invention.
Figure 19:
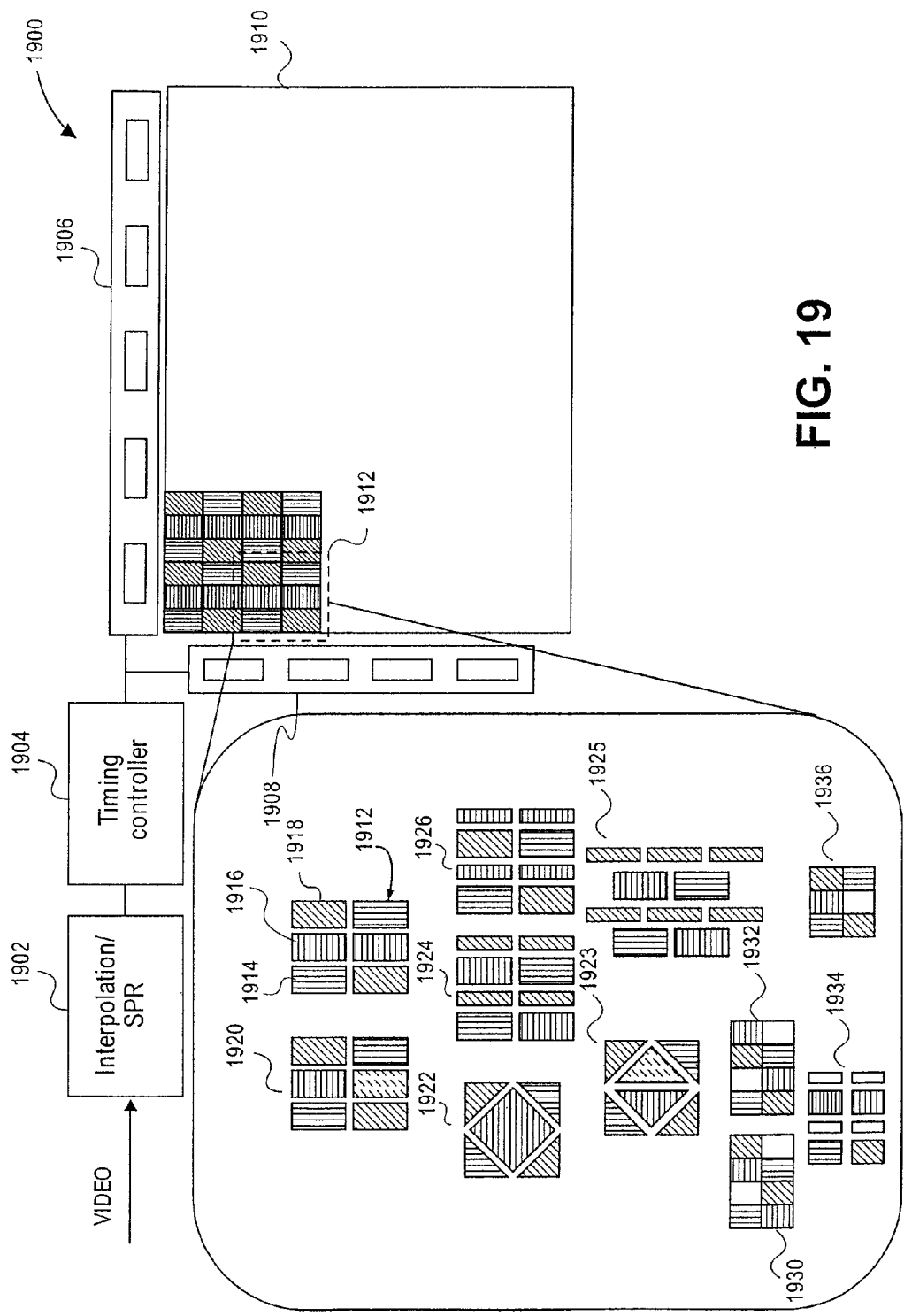
FIG. 19 is a block diagram illustrating a portion of a display system comprising a display panel that may substantially comprise one of several illustrated sub-pixel repeating groups.

FIG. 1 is a simplified block diagram of an image processing system 100 that incorporates improved features of the gamut mapping and subpixel rendering subsystems. System 100 includes display panel 118 which is substantially comprised of a plurality of a subpixel repeating group of the type disclosed in United States Patent Application Publication Numbers 2005/0225574 and 20050225575, both of which are entitled "NOVEL SUBPIXEL LAYOUTS AND ARRANGEMENTS FOR HIGH BRIGHTNESS DISPLAYS." Panel 1910 of FIG. 19 may be one embodiment of display panel 118, and the subpixel repeating group of display panel 118 may be one of the several subpixel repeating groups illustrated in FIG. 19. In the discussion that follows, display panel 118 substantially comprises one of the red, green, blue and white (RGBW) subpixel repeating groups having red, green, blue and white (RGBW) primary colors that are illustrated in FIG. 19.

With reference again to FIG. 1, system 100 comprises an RGB input module 102 that accepts input image data in many possible formats including but not limited to RGB striped image data and other common digital data formats such as YCbCr. This image data may be fed into an input gamma unit 104 to supply system 100 with image data in a linear color space. Optional pre-reduce module 106, described in more detail below, may be employed to reduce the number of out-of-gamut colors that might require clamping at another point in the system.

Image data at this point may be input into Calc W 108 and Calc RwGwBw 110 modules to calculate suitable red, green, blue and white (RGBW) color values for use by system 100. For any RGB image data point that is out-of-gamut for the RGBW system, Gamut Clamp 112 may be employed to select a suitable in-gamut RGBW value for rendering. Such selection via one of many clamping possibilities may represent a choice that optimizes a particular, desired effect—e.g. brightness, hue, saturation, etc.

From these suitable RGBW image values, subpixel rendering (SPR) module 114 may further process the image data to accomplish any number of goals. For example, if the input image data 102 is specified in a first display format (e.g. RGB stripe, triad, etc.) and the output image data is to be rendered on another, second display format (e.g. one of the many subpixel repeating groups illustrated in FIG. 19 or as disclosed in many of the aforementioned patent applications incorporated by reference above), then a mapping must take place between the input image data and the output display format as defined by the subpixel repeating group. Subpixel rendering (SPR) unit 114 includes a combination of hardware and/or software (not shown) suitable for implementing subpixel rendering techniques described in various ones of the aforementioned patent applications incorporated by reference, such as, for example, in US Patent Application Publication Numbers 2003/0103058 (entitled "METHODS AND SYSTEMS FOR SUB-PIXEL RENDERING WITH GAMMA ADJUSTMENT"), 2005/0225562 (entitled "SYSTEMS AND METHODS FOR IMPROVED GAMUT MAPPING FROM ONE IMAGE DATA SET TO ANOTHER"), and 2005/0225563 (entitled "IMPROVED SUBPIXEL RENDERING FILTERS FOR HIGH BRIGHTNESS SUBPIXEL LAYOUTS"). Thereafter, the image data may be processed by an output gamma module 116 and the output image data sent to display panel 118 for rendering.

Gamut Clamping Systems and Algorithms

Figure 9:
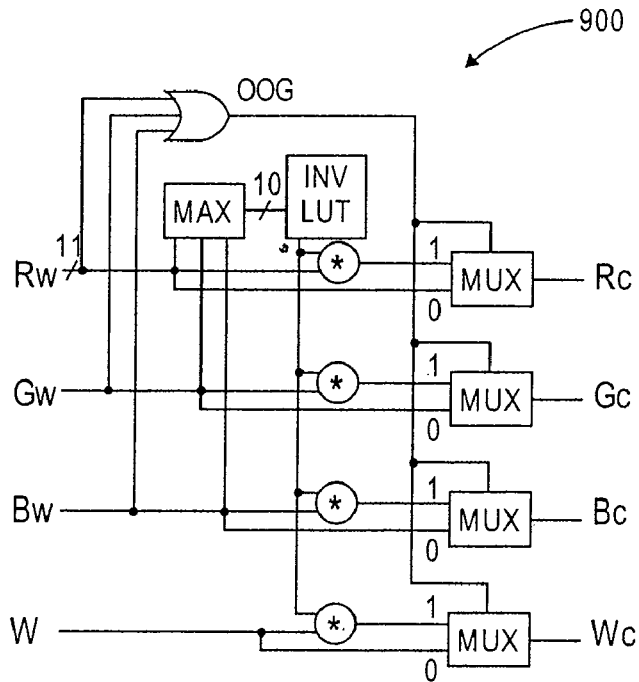
FIG. 9 is a simplified block diagram of one embodiment of a gamut clamping system that performs clamp-to-black.

In several of the aforementioned patent applications incorporated by reference, several gamut clamping techniques are disclosed. See, for example, US 2005/0225562 entitled "SYSTEMS AND METHODS FOR IMPROVED GAMUT MAPPING FROM ONE IMAGE DATA SET TO ANOTHER. For example, with the "clamp to black" technique, luminosity is decreased; but hue and saturation are preserved. FIG. 9 shows one embodiment of a clamp-to-black module 900 from previous inventions. The upper bits of the RwGwBw signals are ORed together to generate an out-of-gamut (OOG) signal. If the color is not OOG, the RwGwBw signals bypass the gamut clamping logic through a set of multiplexors (MUX). When the color is OOG, the maximum of the RwGwBw values is used to fetch an inverse value from a look-up-table (LUT). This inverse value may be pre-calculated so that when it is multiplied by the RwGwBw and W signals, it brings the color back into gamut. This may produce undesirable dark areas in some images which are addressed by methods of this invention.

Figure 2:
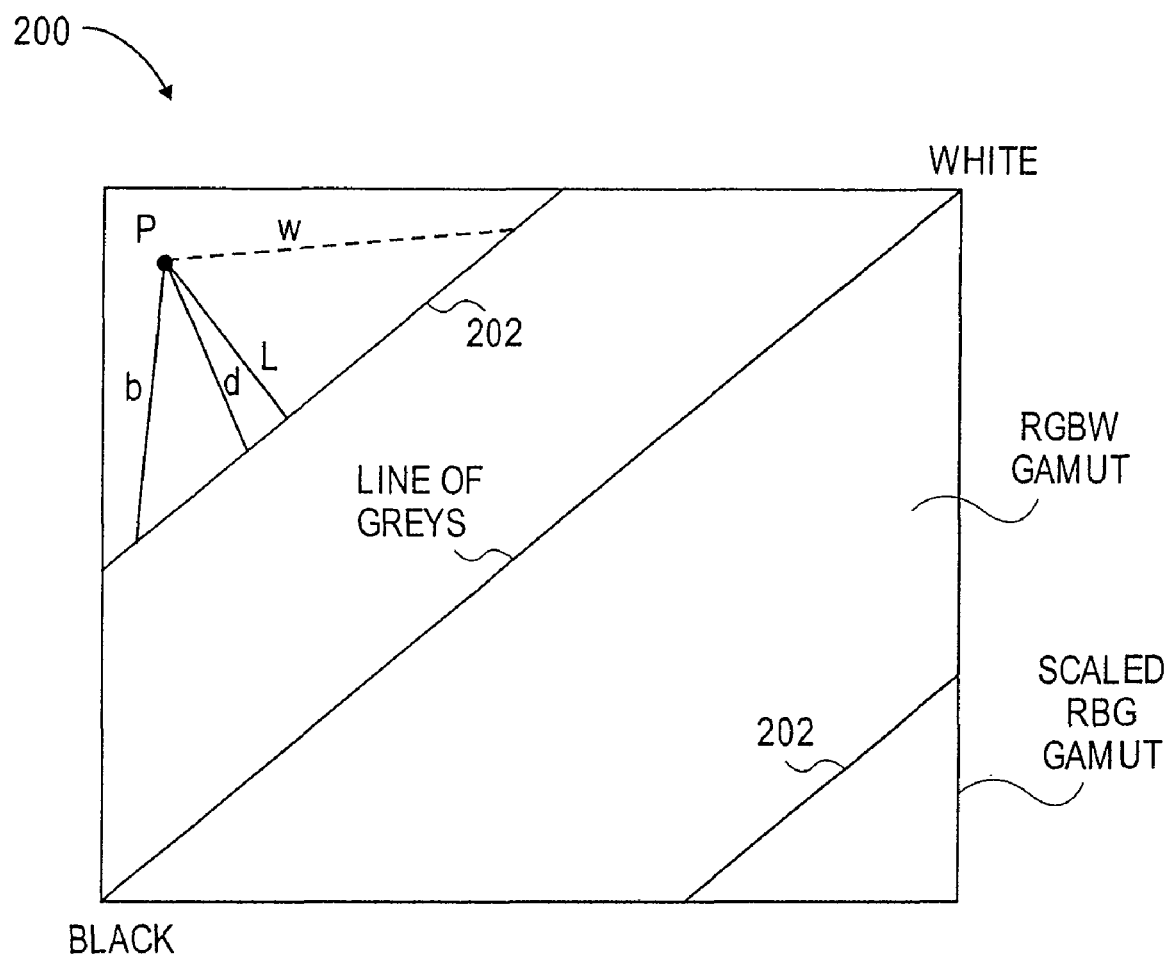
FIG. 2 is a diagrammatic view of a color space in which color points that are out of gamut for a particular display system may be clamped back into gamut along a multitude of paths.

In general, there are a whole host of possible clamping algorithms and systems to affect them. FIG. 2 is a diagrammatic view of a cross section of color space 200 in which lines 202 delimit the allowable and renderable colors in the color space of the display panel of the display system. For points outside of these lines (e.g. point P), these points are "out-of-gamut" (OOG) and it may be desirable to assign an in-gamut color point to render in lieu of color point P. From point P, a large number of lines may drawn from P to the gamut surface renderable by the display system. For example, in "clamp to black", a line could be drawn from P to "Black" along line b and the point where b intersects line 202 is the assigned color point for P. One advantage of "clamp to black" might be that the newly-assigned point preserves the hue and saturation of the out-of-gamut color, although, in some instances, at some sacrifice of luminance. As described in the patent applications incorporated by reference, there are disclosed computationally inexpensive ways to calculate clamp-to-black that can be built into hardware with fewer gates than previous methods.

Other clamping algorithms are possible. For example, "clamp to white" might assign to point P that point that intersects the line drawn from P to "White" (i.e. along line w) and line 202. One possible advantage to "clamp to white" is that the assigned point for P exaggerates luminance in the color point—which may be desirable in viewing images outdoors in bright sunlight or other bright ambient conditions.

Another, intermediate clamping system might include "clamp to luminance"—where a line L is drawn from P perpendicular to the line of grays. This clamping system may have the advantage that it preserves the luminance of the out-of-gamut color point (perhaps at a slight sacrifice of saturation).

Yet another intermediate clamping system might include a "clamp to diagonal"—which is an intermediate point (along line d and intersecting with line 202) between clamp to luminance and clamp to black. One advantage to clamp to diagonal is that it is closer to the minimum distance from P to the gamut hull, or edge. The clamp to diagonal technique might tend to be a better fit for the hue and saturation of P than clamp to luminance; but produce a brighter color than that produced by the clamp to black technique.

Figure 3:
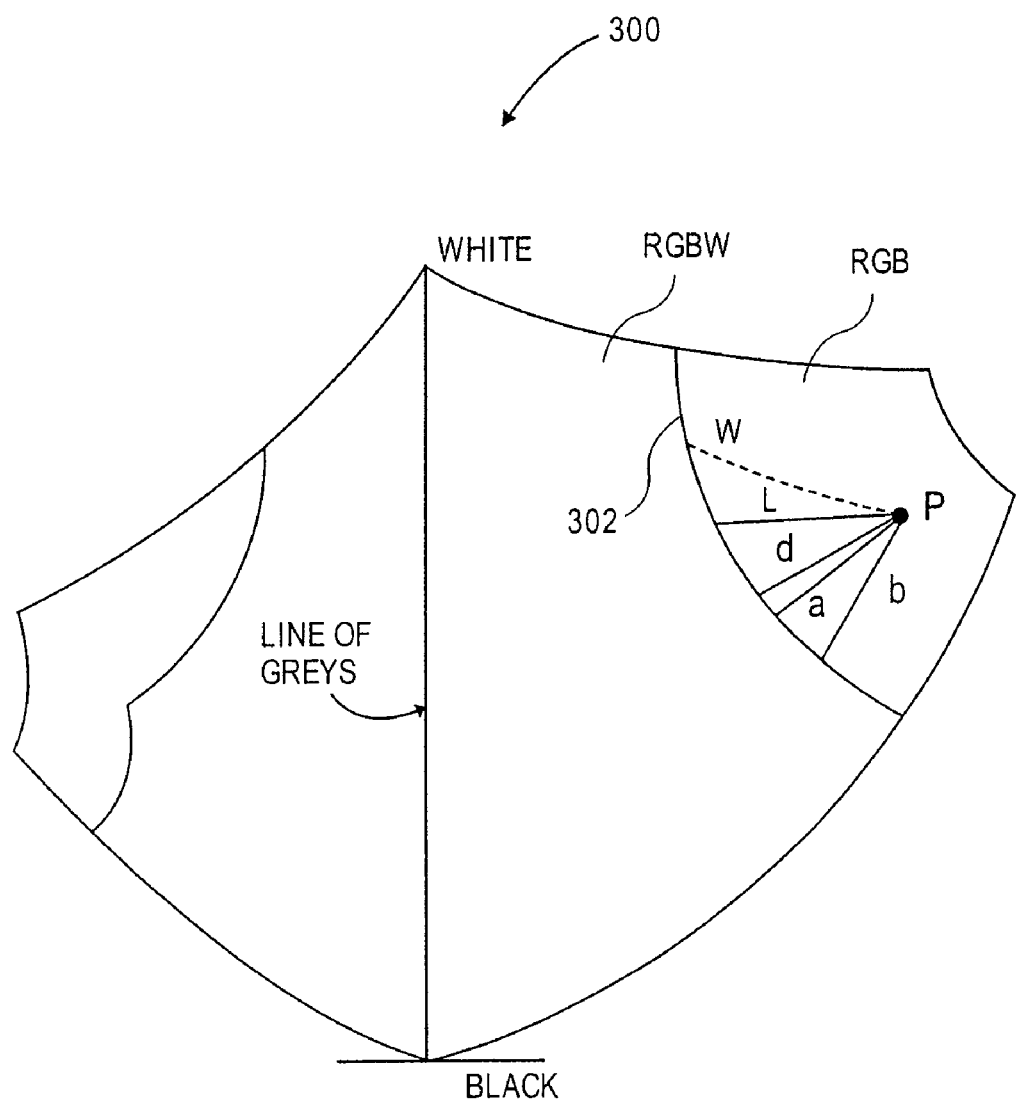
FIG. 3 illustrates a cross-sectional view of CIE L*a*b* color space in which color points that are out of gamut for a particular display system may be clamped back into gamut along a multitude of paths.

FIG. 3 is a view of a cross section in CIE L*a*b* color space 300. In this figure, point P is shown as an out of gamut-color point and clamp to: white, luminance, and black are shown as the intersection of lines (or curves more generally) W, L and b with gamut hull line/curve 302, respectively. The line marked "a" is the unique line/curve which is the theoretical minimal distance from point P to gamut hull 302. While the point of intersection from this line "a" to hull boundary 302 is possible to calculate, it may be expensively so. As a low-cost approximate solution to finding this minimal point, a clamp to diagonal point (i.e. the intersection of line "d" to hull curve 302) may be more easily calculated as a weighted average between clamp to black and clamp to luminance—as will be described in further detail below.

Clamp to luminance will now be described in greater detail. This algorithm proceeds in a similar way as "clamping to black"; but with a different final calculation of W. In addition to clamping the W value at the same time that Rw Gw and Bw are clamped, the W value is calculated backwards from the known input luminosity.

In one embodiment, the calculation of luminosity may be adjusted according to the actual subpixel layout that may comprise the display screen. For example, FIG. 19 depicts a number of different subpixel layouts which may comprise the display screen 1910 in a display system 1900. Display system 1900 is generally shown here as comprising an interpolation/SPR module 1902, a timing controller 1904 and column and row drivers 1906 and 1908 respectively. Display 1910 comprises a set of subpixels that may further comprise a subpixel repeating group 1912. Such repeating group may vary—as depicted in other possible repeating groups 1912 through 1936. Different hatching denotes different colors—for example, vertical hatch 1914 denotes red, horizontal hatching 1916 denotes blue, and diagonal hatching 1918 denotes green. Partial diagonal hatching, closer horizontal hatching, or no hatching at all denotes another fourth color—e.g. cyan, magenta, white (or no filter) or yellow. Other subpixel repeating groups and other display system architectures are of course possible and are encompassed by the scope of the present invention. Although many of the present embodiments refer to GMAs converting RGB to RGBW, it will be appreciated that the present techniques apply to multiprimary systems having more than three primary colors (e.g. 4 or more primary colors, for example R, G, B, Cyan, and W.) Additionally, the techniques of the present invention apply with similar force to displays built from many possible manufacturing technologies, including but not limited to LCD, OLED, PDP and many others.

From one of the subpixel layouts, e.g. 1930, that might comprise the repeating group of the display, the following equation for luminance might suffice:

$$L_{rgb}=(2*Rw+5*Gw+Bw+8*W)/16.$$

This equation states that the calculated luminance of the RGBW output must equal the luminance of the source RGB values. The equation can be solved for W giving:

$$WI=(16*L_{rgb}-(2*Rw+5*Gw+Bw))/8.$$

This formula generally results in a value for WI that is brighter than the clamp-to-black value for W. This in turn causes areas in images to be brighter where clamp-to-black produced an effect viewed by some to be too dark.

The above equation is easy to implement in hardware or software, but is based on the relative luminosities due to the subpixel repeating pattern 1930. For each different layout, this formula may be different. For example, the formula for a subpixel repeating pattern 1936 might be:

$$WI=(12*L_{rgb}-(2*Rw+5*Gw+Bw))/4.$$

The difference between the two formulae above is the result of the relative brightness of W compared to the sum of the brightness of R G and B in each layout. It is possible to write the formula with extra parameters to take this relative brightness into account:

$$WI=(L*M1\_inv-(2*R+5*G+B)*M2\_inv/8)/32$$

where M1_inv and M2_inv may be constants, as described below in the discussion about adjustable gamut mapping (GMA.) It may be shown that these constants allow building a single GMA hardware module that can correctly calculate W1 for many different subpixel layouts by pre-calculating and loading values for M1_inv, M2_inv and several other register settings.

Diagonal Clamping

Figure 15:
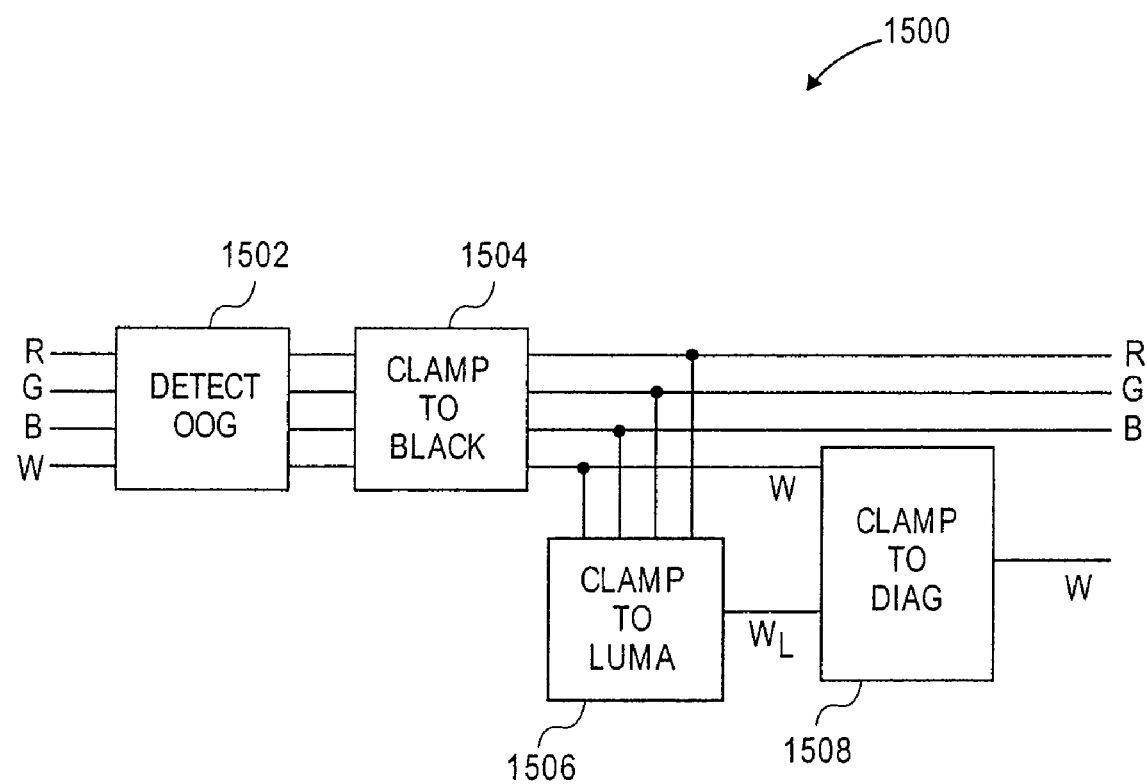
FIG. 15 is a simplified block diagram of one embodiment of a gamut clamping unit.

When implementing the clamp-to-luminance, the resulting colors may be considered too de-saturated by some observers. This effect is in contrast to clamp-to-black which may be considered too dark by some observers. One solution to both of these issues may be to calculate a value between the clamp-to-black value for W and the clamp-to-luminance WI value. FIG. 15 shows a Gamut Clamping Module 1500 that calculates an intermediate value. Detect OOG (out-of-gamut) module 1502 detects if the input RGBW color is in gamut or not. If not, the values are fine as they are and the rest of the gamut clamping module may be bypassed (the bypass not shown in this figure). Clamp-to-black module 1504 performs the usual clamp-to-black algorithm described in previous patents (and reviewed in FIG. 9), the R, G and B values that result may become the final values output from the gamut clamping module. The RGB and W values from module 1504 are also used to calculate W1 in clamp to luma module 1506, using one of the clamp-to-luminance algorithms described above. The clamp-to-black W value and the clamp-to-luma W1 value may be combined in clamp-to-diagonal module 1508 to create the final W value output from module 1500. Clamp-to-diagonal module 1508 may calculate an intermediate value—for one example and embodiment, a weighted average of the W and W1 values. For example, it could calculate the average of the two values.

Figure 10:
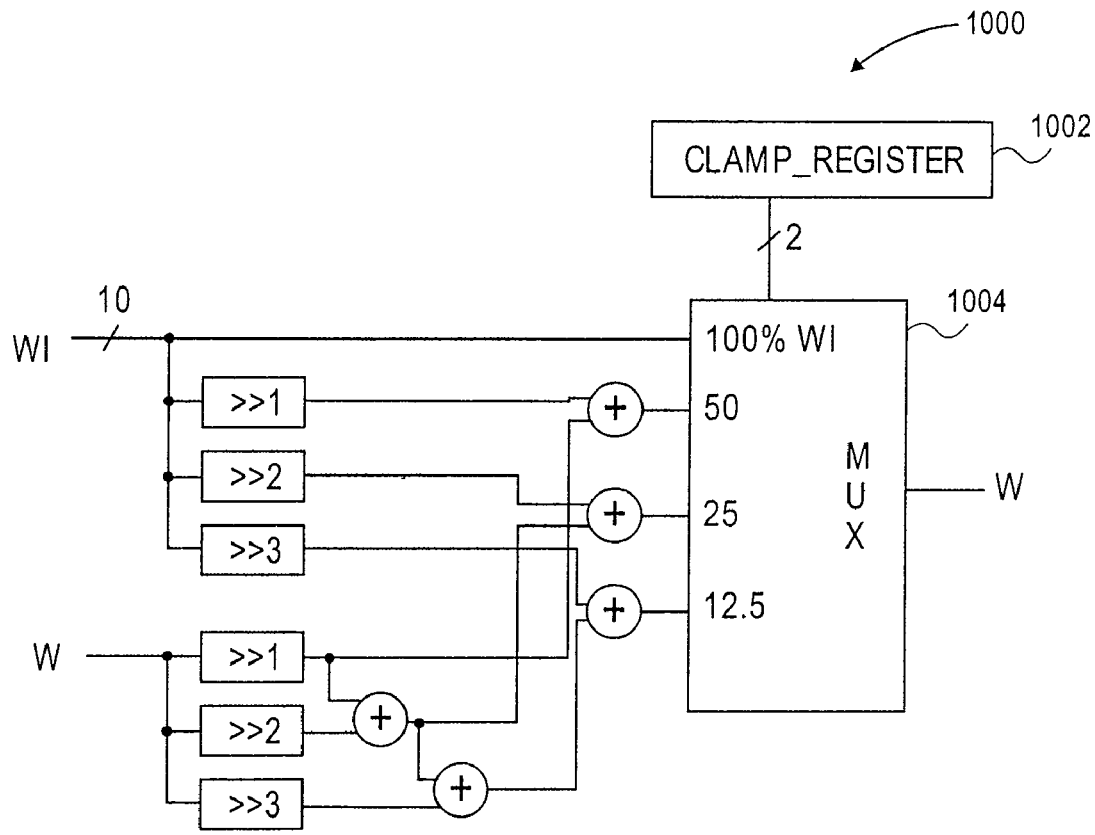
FIG. 10 is a simplified block diagram of one embodiment of a gamut clamping system that performs clamp-to-diagonal.

In another embodiment, shown in FIG. 10, there could be a clamp_register 1002 that sets the amount that the W and W1 values are each weighted. In this embodiment, the W and W1 values are right shifted by different amounts (e.g. 1, 2, or 3 bits as shown) and these are added together in different combinations to generate 100%, 50%, 25% and 12.5% of W1 combined with (respectively) 0%, 50%, 75% and 87.5% of W. The clamp_register value selects one of these options with MUX 1004 as the clamp diagonal combined W output. This embodiment may be designed to select several useful weighting combinations with a minimum of gates. In other embodiments, there could be more different combinations of percentages to select from. In yet another embodiment, multiplier modules could be used on W and W1 instead of simple shift and adders to generate a more continuous range of percentages.

One difference between the clamp-to-luminance line 'L' in FIG. 3 and the clamp-to-black line 'b' is in the W primary of the RGBW display. In one embodiment, a calculation in W may be desirable and the R, G and B values may remain constant during these steps. These calculations may be done when one (or more) of the other primaries have gone out-of-gamut and have been scaled down to the gamut surface. In these cases, changing only W means that the average, or any other weighted average of the two W values, may result in a color that lies on the surface of the gamut.

There may be many ways to calculate the clamp_register value. Setting or selecting 50% would effectively generate the average of the two W values. Setting or selecting 75% would generate a value equal to 0.75*W1+0.25*W, which may be closer to the value shown as line 'a' in FIG. 3. One way to determine a ratio of weighting values would be to calculate all possible out-of-gamut values offline in a computer program. This program would do the difficult calculation for each color to find the value 'a' and calculate the weighted average that would produce this from each W1 and W value. The average of all these weighted average values would then be designed into the video display or loaded into internal hardware clamp_register latches.

As mentioned above, it may be advantageous to use the clamp to white line 'W' in FIG. 3. In this case, the weighted average could be calculated between the W1 and the Ww (the W calculated with clamp-to-white similarly to the way that W is calculated during clamp-to black) values or between the W and the Ww values.

In an alternate embodiment, the single weighted average could be replaced with a function that varies from place to place in the gamut. The independent variable for this function can be one of any number of input parameters. Examples include that the weighted average changes as a function of the luminosity of the input pixel, as a function of the amount that the input color is out-of-gamut, as a function of the input R, G or B values, or some combination of these. One function to use may be different on different displays depending on its properties. Properties that may effect which function to use might include: the measured primary chromaticities, primary luminosities, gamma curves of the output, the brightness or color of the backlight. One procedure to discover a desired weighted average function would be to measure the display properties and compare the independent variables against the results of the program mentioned above which calculates all candidate ideal 'a' points values for all out-of-gamut colors. There may be a direct correlation from some input function to weighted average values, or there may be some approximate mappings that can be used. Once a function is chosen, it can be encoded into software or built into hardware. The function may be implemented as an algorithm or calculated beforehand and stored in a look-up-table.

Pre-Reduction Algorithms

One possible side effect of RGB to RGBW GMAs may be to reduce the total number of color states that a display system can produce. It may be possible that as many as half of the total number of input colors are mapped onto other colors. This might tend to happen to colors that are both high-brightness and high saturation at the same time, a combination that does not typically occur in natural and unmodified images. However, it might be desirable to have a mode where the total number of colors output by our GMA matches the number of colors that arrive. Pre-reduction is one way to accomplish this.

Figure 4:
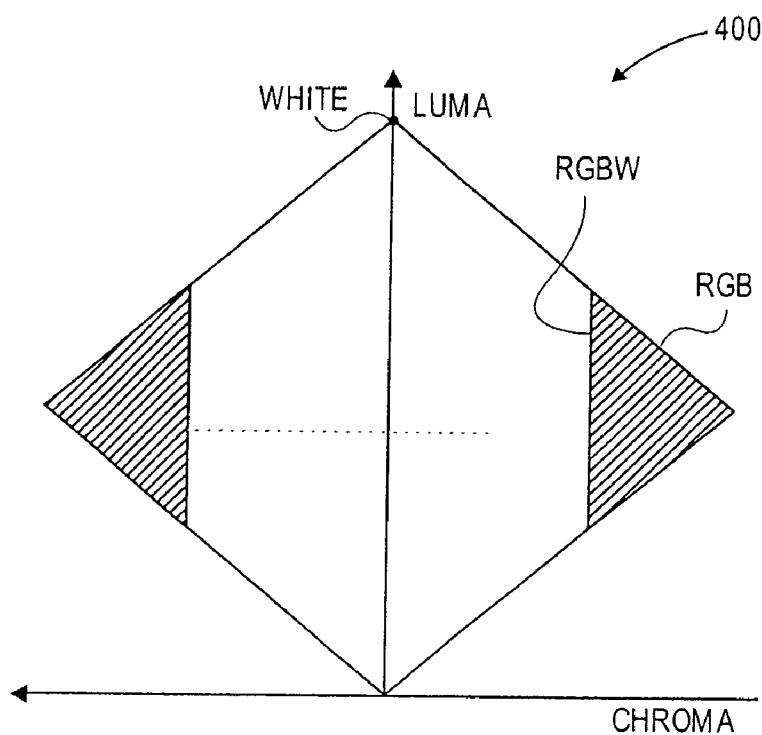
FIG. 4 illustrates a region of a color space to which red, green and blue (RGB) color values may be clamped in order to render the color values on a display having RGB and W (white) primary colors.
Figure 5:
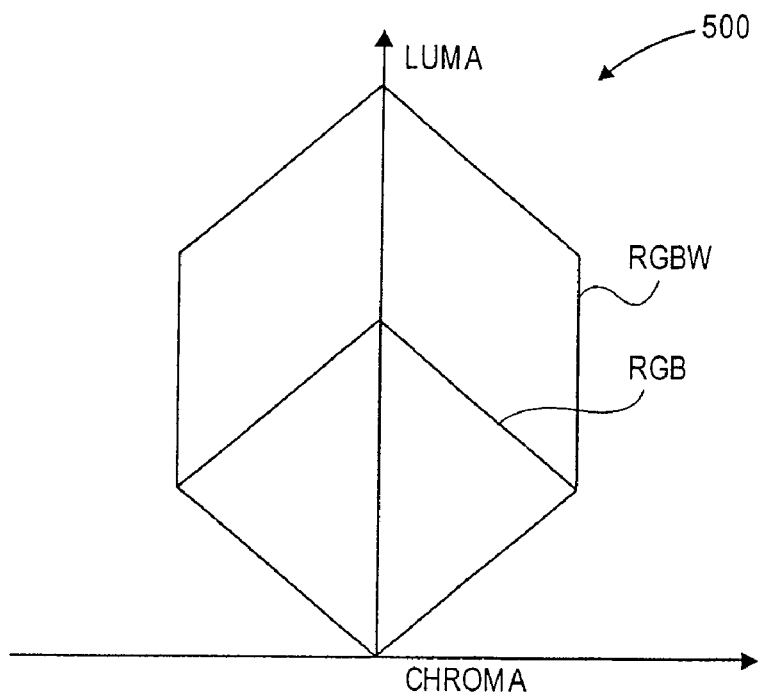
FIG. 5 is a diagrammatic view of a color space illustrating the effects of pre-reduction of the RGB color primaries according to techniques described herein, in order to decrease the number of input color values that are out-of-gamut.

FIG. 4 shows the prior art case where the RGB gamut is essentially scaled until the input RGB white point is mapped onto the RGBW white point. The high brightness+high saturation colors in the shaded areas become out-of-gamut and must be mapped to allowed RGBW values using clamp-to-black, clamp-to-luma, clamp-diagonal or other algorithms as described above. FIG. 5 shows that by a pre-reduction of the input values, eventually the entire RGB gamut may fit inside the RGBW gamut. In such a case, it may obviate the step of OOG mappings. Although the resulting images may not be as bright as before, there are actually more total output states used. Not all possible W values may be used, but all possible RGB output values may be, which may not be the case when some colors are OOG.

Figure 16:
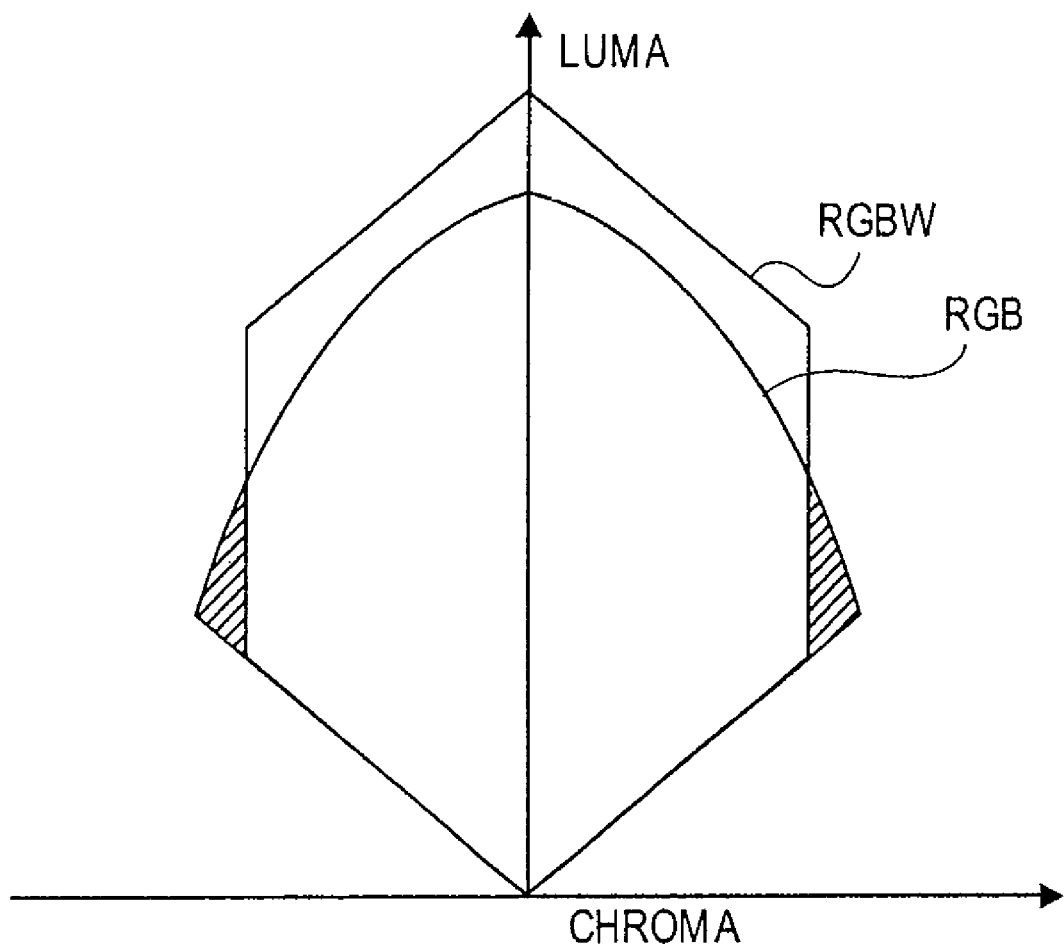
FIG. 16 is a diagrammatic view of a color space illustrating the effects of changing a pre-reduction factor to restore bright unsaturated colors according to any one of the embodiments of FIGS. 7 and 8.

In the case of some layouts, like 1930, pre-reducing the input values by one half may make the RGB gamut fit inside the RGBW gamut. Reducing by other amounts may be desirable for layouts when the brightness of the W sub-pixel does not exactly equal the brightness of the other 3 sub-pixels. Also, pre-reducing by amounts smaller than one half may increase the total number of output states somewhat, even though some colors will still go OOG, as shown in FIG. 16. Even in displays with the W sub-pixel brightness equal to the other three primaries, this procedure may increase the brightness of the image and be desirable.

Figure 6:
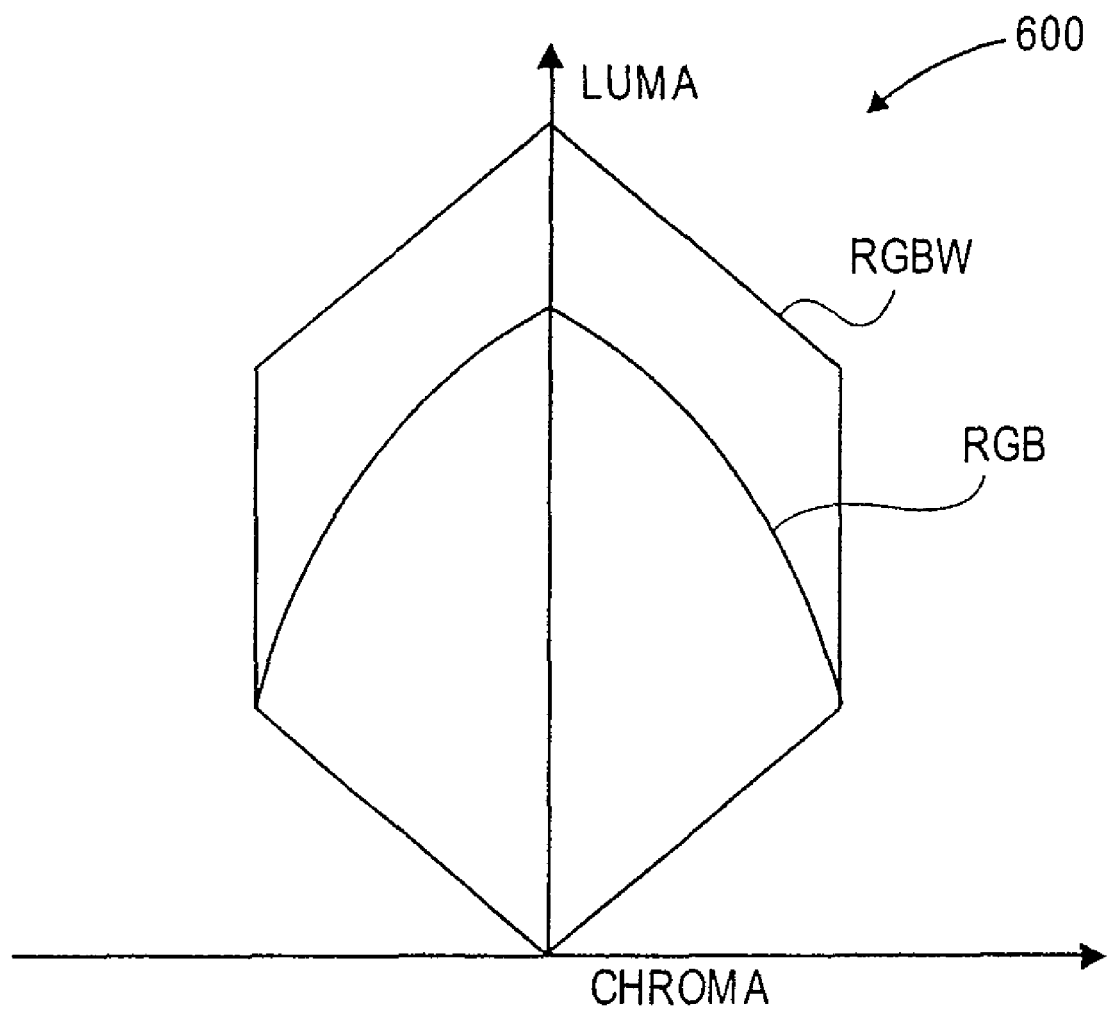
FIG. 6 is a diagrammatic view of a color space illustrating the effects of scaling the W primary after pre-reduction on color saturation values.

FIG. 6 shows the effect 600 of an alternate embodiment. In this case, the input RGB values may be pre-reduced until no OOG values result. Then the normal RGBW GMA may be used to convert to RGBW. Finally, the W values may be scaled up by an amount that makes the largest W value (usually from bright saturated colors near white) hit the maximum value. FIG. 6 shows the layout 1930 case where the input RGB values have been pre-reduced by half, and then the resulting W values have been scaled up by a factor of 2. This results in a maximum brightness of about 75% of the maximum possible. Other combinations may produce brighter maximum values, for example reducing the input by a percentage smaller than one half. However, these combinations may produce more OOG colors and decrease the total number of output states.

Figure 7:
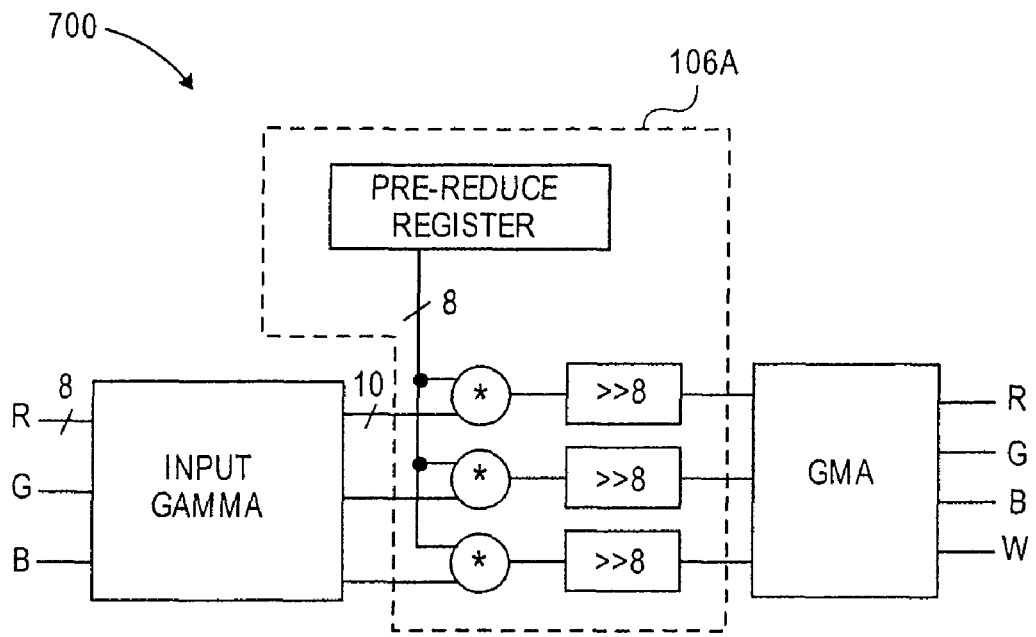
FIG. 7 is a simplified block diagram of one possible embodiment of a pre-reduction system.

FIG. 7 shows one embodiment 700 of a pre-reduction module 106A between the input gamma module and GMA module. In this embodiment, a percentage is stored as a fixed point binary number in a Pre-reduce register. In one embodiment, the pre-reduce register may be 8 bits big and may store a number between 0 and 255, representing a fixed point number between 0 and approximately 0.996. Each of the input RGB values after input gamma may be multiplied by the pre-reduce value, then divided by 256 in right shift modules (e.g. >>8).

Figure 8:
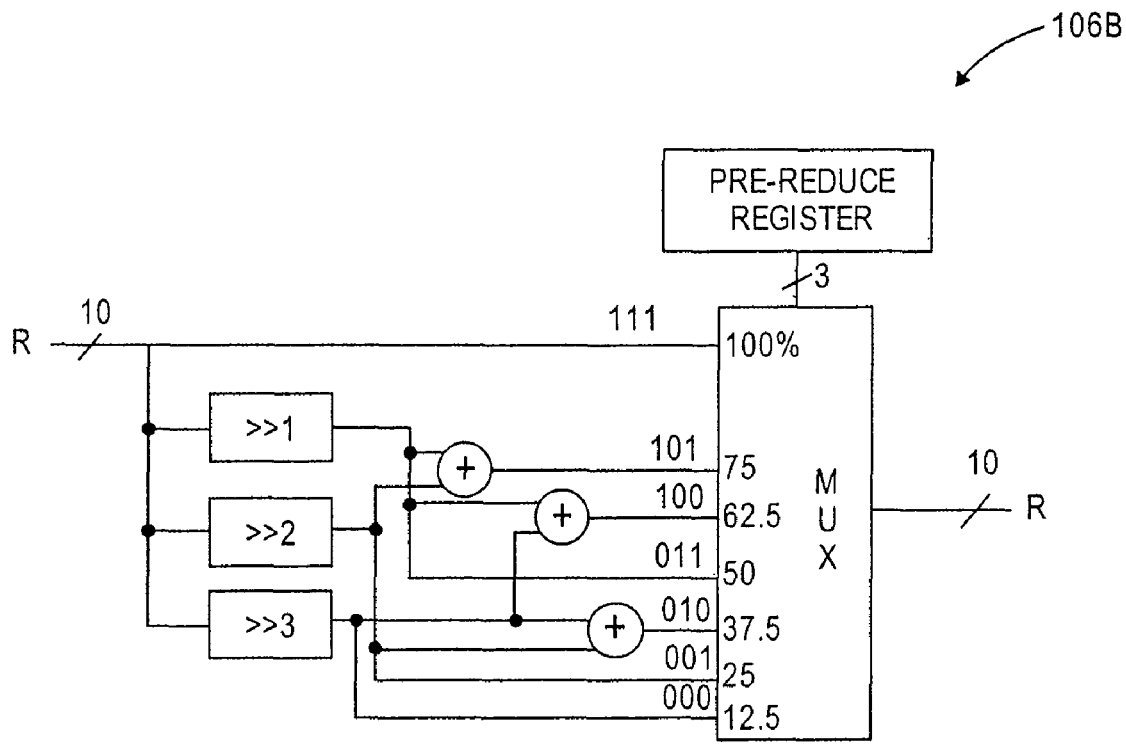
FIG. 8 is a simplified block diagram of another possible embodiment of a pre-reduction system.

The embodiment in FIG. 7 may be easily implemented in software, but the multipliers may require a large number of gates. The pre-reduce module 106B of FIG. 8 is an alternate embodiment that requires fewer gates. This figure shows only the path for the R channel—a similar module may be implemented for G and B. Instead of using a multiplier, the input values are shifted right by different amounts, and the results are added together in different combinations to produce 100% of the input (no reduction), 75% (25% reduction), 62.5%, 50% 37.5% 25% and 12.5%. Instead of storing a fixed point binary number in the pre-reduce register, an index may be stored that selects one of the pre-calculated percentages using a MUX. This set of percentages is only one example. By adding more shifters, adders, and a wider multiplexor, any number of selectable reduction percentages can be produced.

Saturation-Based Pre-Reduction

Figure 17:
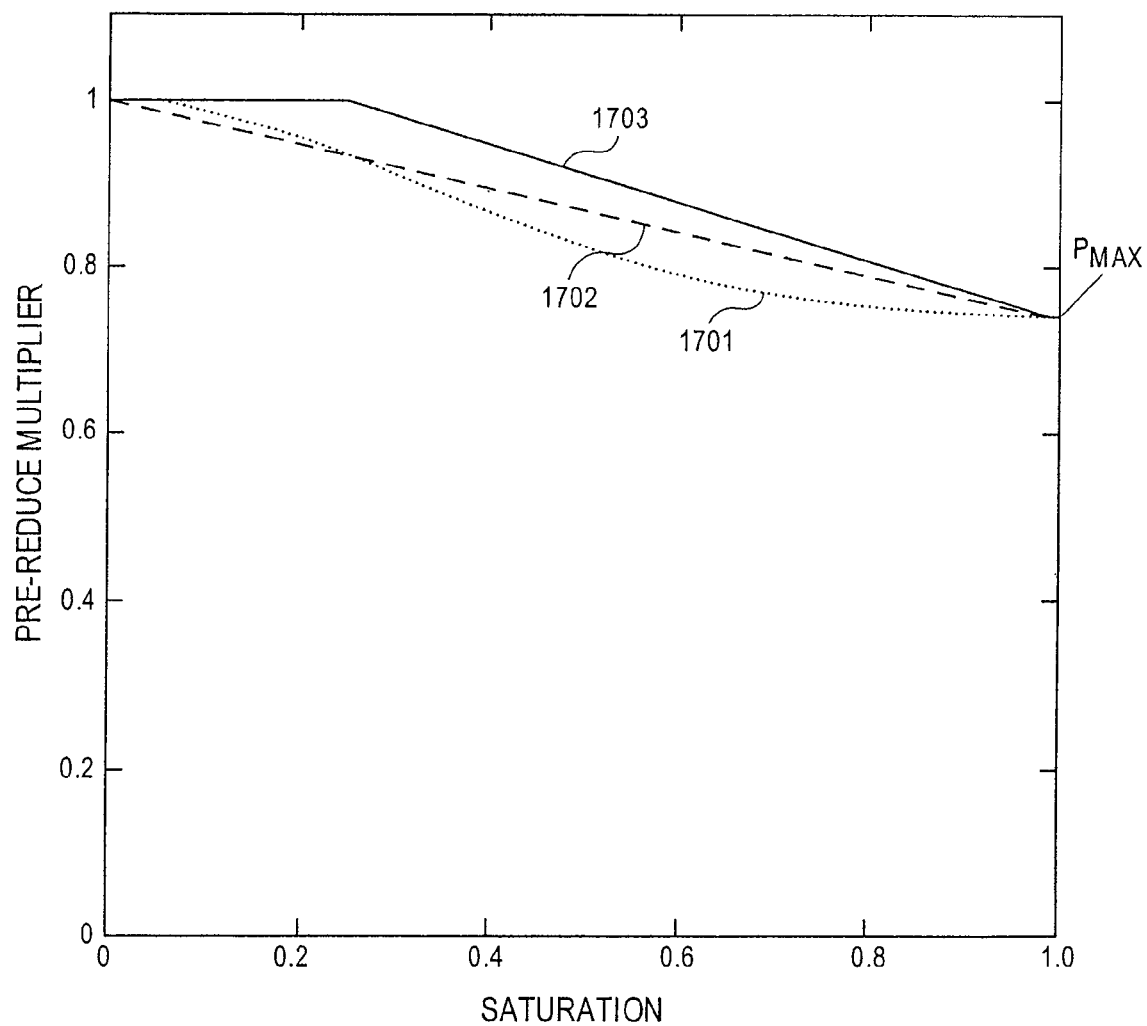
FIG. 17 illustrates a graph of several different function curves which may be used with saturation-based pre-reduction according to any one of the embodiments of FIGS. 7 and 8.
Figure 18:
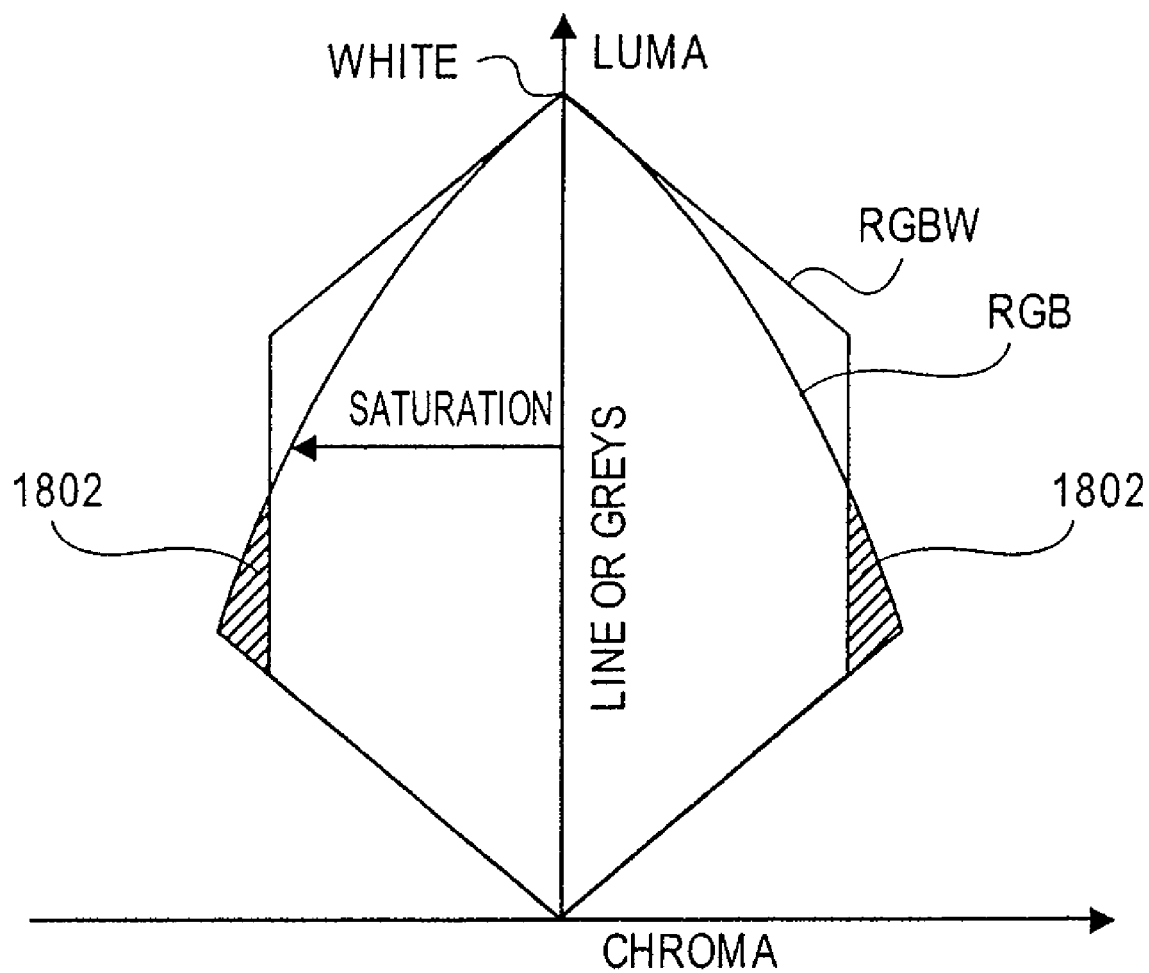
FIG. 18 is a diagrammatic view of a color space illustrating how saturation-based pre-reduction may restore the brightest unsaturated colors according to any one of the embodiments of FIGS. 7 and 8.

As another alternate embodiment of pre-reduction, the input RGB values may not be reduced by a fixed amount, but instead by an amount that is a function of saturation. FIG. 17 shows several different embodiments of functions of saturation that may be adequate. A function which has values near 1.0 when saturation is near zero has the advantage of mapping the input RGB white value approximately to the output RGBW white value, as shown in FIG. 18. This may be advantageous over the pre-reduction algorithms above where the maximum possible white value may not be achieved. In another embodiment, the maximum value may be less than 1.0 to reduce simultaneous luminance contrast error. The functions of saturation of FIG. 17 may decrease to some percentage Pmax when saturation is at a maximum. If this Pmax value is larger than M2, the ratio of the brightness of W to the sum of the brightness of the R+G+B subpixels in the display, then there will be some OOG colors, as shown as the shaded areas 1802 of FIG. 18. Thus, a gamut clamping module as described above may still be desirable.

One possible curve for this saturation function is a Gaussian such as line 1701, but this may be computationally difficult to implement in hardware. A straight line such as line 1702 may be adequate, and a piecewise linear function such as line 1703 may also produce pleasing images. The values from this function are multiplied by the input RGB values. Thus, multiplying by 1.0 causes no reduction of the input values with low saturation and multiplying by Pmax or other fractions less than one will result in decreasing input values that have high saturation. All these multiplications by fractional values may be implemented in hardware by multiplying by fixed point binary numbers followed by appropriate right shifts. Other means of implementing multiplication by shifts and adds are also included as part of the scope of the present invention.

Saturation in FIG. 18 may be considered the perpendicular distance away from the line of grays, typically scaled to range from 0 to 1.0 at the surface of the gamut. Although any number of calculations of saturation could be used, there are approximations to calculating this number which are well known in the industry, for example, $$\text{Saturation} = (\max(r,g,b) - \min(r,g,b))/\max(r,g,b)$$

The resulting saturation value may then used to generate one of the curves from FIG. 17. The piecewise linear line 1703, for example, with a Pmax value of 0.75 may be generated by the following equation:

$$\text{Pre\_reduce} = \min(1, 1 - ((\text{Saturation} - 0.25)/(1 - 0.25))).$$

Then the input red green and blue values may be each multiplied by such a Pre_reduce value, as generated by any of the above embodiments:

$$R = R * \text{Pre\_reduce}$$

$$G = G * \text{Pre\_reduce and}$$

$$B = B * \text{Pre\_reduce}.$$

Finally, these R, G and B values may be run through a GMA algorithm to convert RGB to RGBW.

In yet another embodiment, the pre-reduction function may also be made a function of hue. In an aforementioned patent application incorporated by reference, there is disclosed means of calculating a hue value that could be used for this purpose. Faces and other skin tones, for example, have a very narrow range of hue and it may be advantageous to use a different pre-reduction function on images with these features.

In yet another embodiment, the pre-reduction saturation function may also be made a function of brightness. So for a given saturation value, rather than using a constant scaling value, one would scale based on the proximity to BLACK. This would act like a gamma function, and it allows one to shift the output pixel distribution closer (or farther) to the RGBW gamut hull. It should also be appreciated that the pre-reduction function could be based as a function of some combination of hue, saturation and brightness.

In the discussion above, one embodiment might have only one pre-reduction function for all primaries. It may be desirable, however, to have a separate pre-reduction function for each (or a subset) of the input R G and B primaries. This could add the ability to do color correction or adjust the white point of the display. The white point may be changed independently of changes in mixed color points by changing the upper left end of curve 1703 (to reduce it from 1.0 to a lesser value on the Y axis of FIG. 17) separately for red, green and blue.

Having separate controls or adjustment for the primaries as discussed above, allows for the adjustment of the chromaticity of mixed colors (e.g yellow, cyan, magenta, etc). For example, if red and green have separate Pmax controls and the green Pmax control is 25% lower than the red Pmax value, then the yellow color point will shifted towards the red primary color. Further, if the slope of the curve 1703 is made to be sufficiently steep near Pmax, then this change in yellow may be made without affecting the white point of the display.

In FIG. 1, the pre-reduction module 106 is shown as placed between the input gamma 104 and the Calc RwGwBw module 110. It is also possible to place pre-reduction in other places in the image processing system, such as before the input gamma module 104. Because the values before input gamma typically have a smaller bit-size, this may have the advantage of decreasing the gate count of hardware based on this design. In addition, it is possible to combine the pre-reduction functions with the input gamma function, performing the gamma correction and the pre-reduction in one step. Because the input gamma function is often implemented as a look-up-table that is pre-calculated, it may then be possible to use superior algorithms, such as the Gaussian curve 1701 in FIG. 17 without paying a penalty in more complicated hardware.

Adjustable RGBW GMA

In aforementioned patent applications incorporated by reference, some embodiments disclose RGBW GMAs that have pre-calculated fixed numbers in the algorithms that were based on measurements or simulations of the primary colors and relative brightness of the different sub-pixels. It will now be disclosed embodiments that calculate such numbers and an embodiment of the RGB to RGBW GMA that is more flexible. In one embodiment, the fixed numbers may be variables in the GMA algorithm and/or registers in the hardware design. This allows a single GMA algorithm to work on a wide range of displays by changing the values in an initialization phase.

These numbers—designated M0, M1 and M2—may be calculated beforehand and the results used to simplify the hardware design. One possible set of equations are as follows:

$$M0 := \frac{Y_r + Y_g + Y_b}{Y_r + Y_g + Y_b + Y_w}$$

$$M1 := \frac{Y_w}{Y_r + Y_g + Y_b + Y_w}$$

$$M2 := \frac{Y_w}{Y_r + Y_g + Y_b}$$

More generally, M0 may be the ratio of the sum of the R G and B luminosities divided by the sum of the R G B and W luminosities; M1 may be the ratio of the W luminosity divided by the sum of the R G B and W luminosities; and M2 may be the ratio of the W luminosity divided by the sum of the R G and B luminosities.

In certain layouts (e.g. layout 1930), the luminosity of the W sub-pixel may approximately equal the sum of the luminosity of R G and B and thus the M2 constant may have a value of approximately 1.0. In this case, M0 and M1 may be approximated by the following:

$$M0 := \frac{1}{1 + M2}$$

$$M1 = \frac{M2}{1 + M2}$$

More generally, M0 may be the ratio of the sum of the R G and B luminosities divided by the sum of the R G B and W luminosities; M1 may be the ratio of the W luminosity divided by the sum of the R G B and W luminosities; and M2 may be the ratio of the W luminosity divided by the sum of the R G and B luminosities.

The "M" values above are typically floating point values that may vary in the range of slightly above zero to slightly above one. In the GMA algorithms where these values are used, these values may be used in multiplies and divides. In the hardware, it may thus be advantageous to store these as fixed point binary numbers so that integer multipliers and shift modules can perform these operations. To simplify the hardware design, it may be possible to pre-calculate the fixed point binary numbers that may be employed and store them in several registers. These registers may then be loaded as part of the display initialization, or they could be fetched from a Look Up Table (LUT) based on an M2_reg index. Table 1 below shows one embodiment of such LUT that may be calculated from a useful range of M2 values.

TABLE 1

| M2_REG | M2    | M0_inv | M0_sub | M1_reg | M1_inv | M2_inv |
|--------|-------|--------|--------|--------|--------|--------|
| 0000   | 0.5   | 48     | 681    | 85     | 96     | 64     |
| 0001   | 0.625 | 52     | 629    | 98     | 83     | 51     |
| 0010   | 0.75  | 56     | 584    | 109    | 74     | 42     |
| 0011   | 0.875 | 60     | 545    | 119    | 68     | 36     |
| 0100   | 1     | 64     | 511    | 128    | 64     | 32     |
| 0101   | 1.125 | 68     | 480    | 135    | 60     | 28     |
| 0110   | 1.25  | 72     | 454    | 142    | 57     | 25     |
| 0111   | 1.375 | 76     | 430    | 148    | 55     | 23     |
| 1000   | 1.5   | 80     | 408    | 153    | 53     | 21     |
| 1001   | 1.625 | 84     | 389    | 158    | 51     | 19     |
| 1010   | 1.75  | 88     | 371    | 162    | 50     | 18     |
| 1011   | 2     | 96     | 340    | 170    | 48     | 16     |

In this embodiment, M2_REG is the index (in binary) to the LUT of fixed point binary values. M2 is the original floating point value which is not stored in the LUT. M0_INV is the inverse of M0 calculated as 1/M0 times 32 to create a fixed point binary value. M0_sub is the maximum color (1023 in this case) times M0. M1_reg is the M1 value times 256 to create a fixed point binary value. M1_inv is the inverse of M1 calculated as the fixed point binary value from 1/M1 times 32. M2_inv is the inverse of M2 calculated as the fixed point binary value from 1/M2 times 32. It will be appreciated that such a table may be constructed in many possible ways and that the scope of the present invention encompasses these other embodiments.

The choice of pre-multiplying by 256 or 32 may be chosen depending on the expected values of the constants and the bit sizes of the internal multipliers. Using this combination of pre-multiplication values may allow all of the values to fit in 8 bit registers (except M0_sub which is not a multiplier). Multiplying by 32 allows values larger or smaller than one to be stored, but other powers of two would work almost as well. For example, multiplying by 64 would add extra precision but would decrease the maximum value which could be stored.

It should be noted that not all combinations of fixed point binary M values and their inverses are listed above. For example, only M2_inv is calculated and the non-inverted value of M2 is not calculated. This is because the equations in the following GMA algorithm may not multiply by M2, only divide by it, so the "non-inverted" M2 value may not be calculated or stored in a LUT or register.

Once a set of these fixed point binary M values have been fetched from a table like the one above, or calculated and stored in registers during system initialization, the following pseudo-code shows how the M values may then be used.

TABLE 2

```
--calculate the range of possible W values
minW=math.floor((math.max(r,g,b)-M0_sub)*M1_inv/32) --minimum possible W
minW=math.max(minW,0)                      --clamp to zero
maxW=math.floor(math.min(r,g,b)*M1_inv/32)  --maximum possible W
maxW=math.min(maxW,MAXCOL)              --clamp to maximum possible value
minW=math.min(minW,maxW)                --min must be <= max
    --calc W from Luminosity, clamped to the possible range
L = math.floor((2*r + 4*g + g + b)/8)       --luminance approximation
W = math.min(L,maxW)            --start by setting W to luminosity
W = math.max(W,minW)            --but clamp it to the max and min allowed
    --calc RwGwBw from input and W
R = math.floor((r-math.floor((W*M1_reg+128)/256))*M0_inv/32)
G = math.floor((g-math.floor((W*M1_reg+128)/256))*M0_inv/32)
B = math.floor((b-math.floor((W*M1_reg+128)/256))*M0_inv/32)
    --check for out-of-gamut (OOG)
if (math.max(R,G,B)>MAXCOL) then
   oog= spr.band(math.max(R,G,B),MAXCOL) --lower bits of OOG primary
   inv = math.floor((256*(MAXCOL+1))/(math.max(R,G,B)+1)) --inverse value
     --clamp to black calculation
R = math.floor((R * inv + 128)/256)
G = math.floor((G * inv + 128)/256)
B = math.floor((B * inv + 128)/256)
W = math.floor((W * inv)/256)      --clamp to black value for W
     --clamp to luminance calculation
     --calculate the W that reproduces the input luminance
W1 = math.floor((L*M1_inv-math.floor((2*R+5*G+B)*M2_inv/8))/32)
W1 = math.min(W1,MAXCOL)           --do not exceed the max!
     --clamp diagonal calculation
W = math.floor((W1*clamp_diag+W*(128-clamp_diag))/128)
end --OOG
```

In the pseudo-code in Table 2, r g and b are the input colors after input gamma correction, math.floor(_) indicates the truncated integer result of any calculations, math.min(_) and math.max(_) return the minimum or maximum of their arguments, and spr.band(_) returns the bit-wise logical and of the two arguments. The term inv is the inverse of the out-of-gamut (OOG) distance; this is often pre-calculated and stored in a LUT indexed by OOG.

When gamut clamping, first the clamp-to-black values may be calculated, then the clamp-to-luma W1 value may be calculated. Finally, the clamp diag value (0 to 128) may be used to calculate a weighted average of the two clamped W values.

Figure 11:
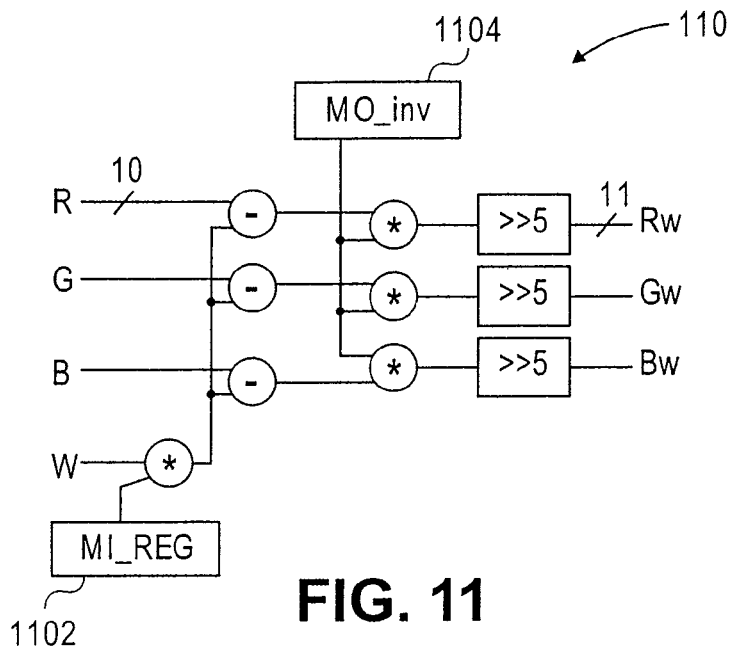
FIG. 11 is a simplified block diagram of a portion of one embodiment of an adjustable gamut mapping system.
Figure 14:
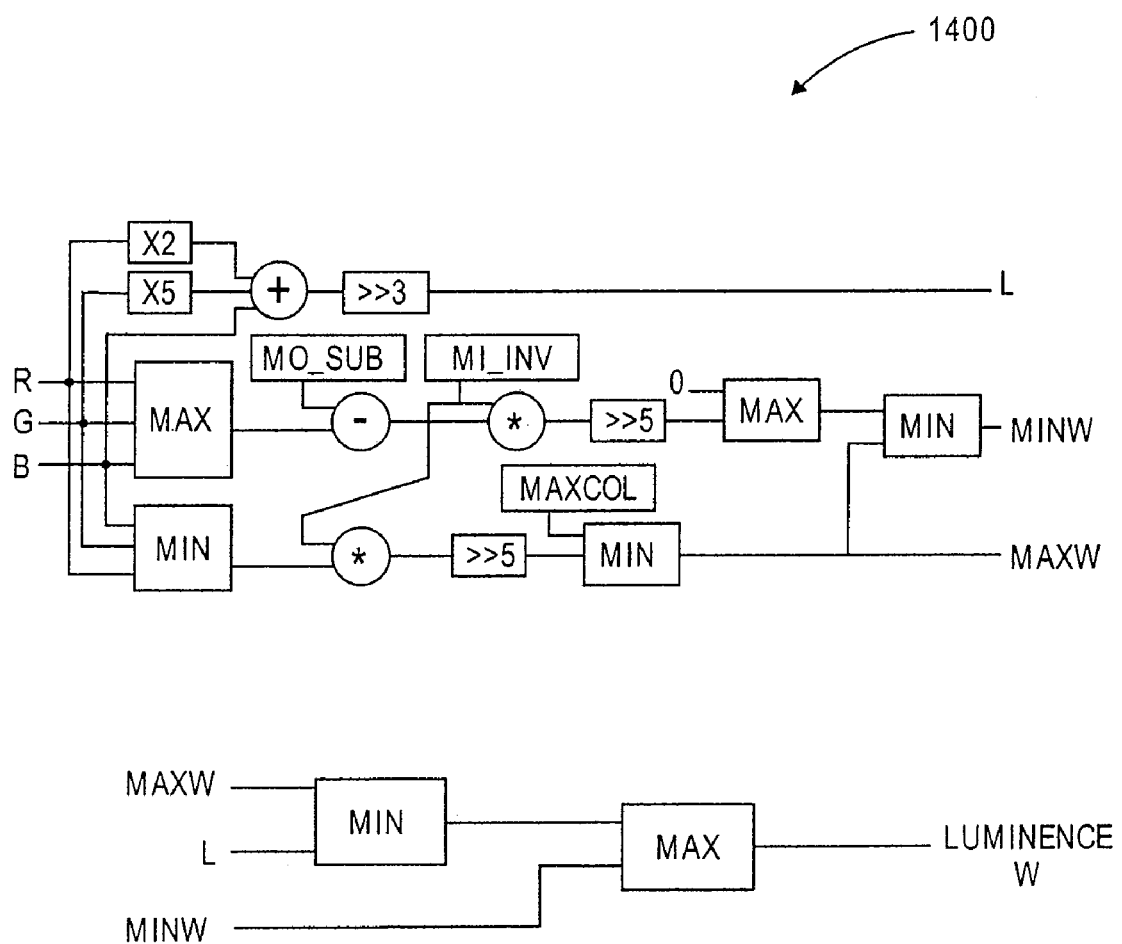
FIG. 14 is a simplified block diagram of a portion of the embodiment of the adjustable gamut mapping system of FIG. 11.

Diagrams of one embodiment of the adjustable GMA are shown in FIGS. 14 and 11. FIG. 14 shows how the L (luminance) and luminance based W value may be calculated in the GMA. The L value may be calculated from an approximation L=(2*R+5*G+B)/8 which is easy to encode in hardware. The M0_sub, M1_inv values may be used to calculate the minimum and maximum possible W value that should not result in an out-of-gamut value. The W value may be set to the L value, and then clamped to lie between a MINW and MAXW value. As mentioned in patent applications incorporated by reference above, there are many other ways to initialize the W value besides starting with L, as long as it is clamped between the MINW and MAXW value.

FIG. 11 shows how the M0_inv register 1104 and the M1_reg register 1102 may be used to calculate the RwGwBw values from the input RGB values and the W value. In this embodiment, because the M0_inv value was multiplied by 32 to make it a fixed point binary number, the result of the multiplies is then shifted right by 5 bits. (i.e. $32=2^5$). The resulting RwGwBw values may be out-of-gamut and may have to be tested and optionally clamped by a gamut clamping module such as that shown in FIG. 15.

Post SPR Filtering

In several aforementioned patent applications incorporated by reference, there are described several methods of sub-pixel-rendering (SPR) images for different display layouts. These SPR algorithms may optionally contain a sharpening filter as one of the steps. For example, there may be cross-luminance-sharpening, and metamer-sharpening. In an adjustable GMA it may be desirable to use metamer-filtering when the M2 value is close to 1.0, namely when the ratio of the W luminosity is close to the luminosity of the sum of R, G and B. However, when the value of M2 is not close to 1.0, it may be desirable to use cross-luma-filtering. In one embodiment, it is possible to have SPR module 114 of FIG. 1 calculate the sharpening filter results a number of ways (e.g. metamer and cross-luma) and then use a weighted average of the results.

Figure 12:
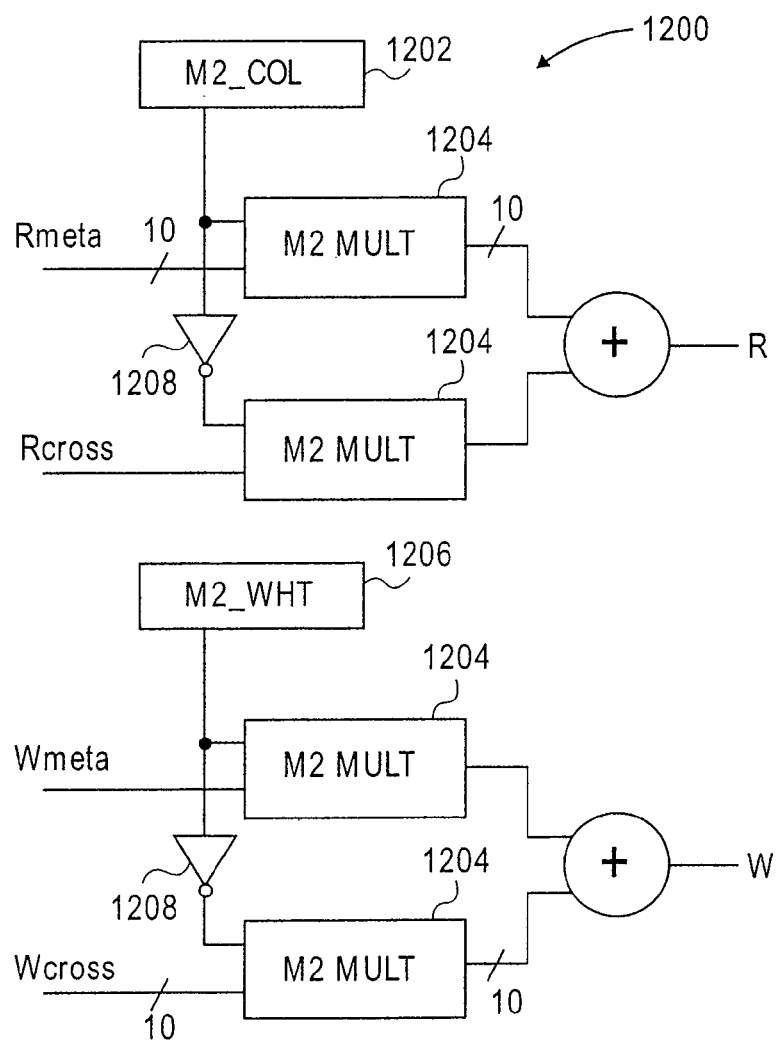
FIG. 12 is a simplified block diagram of one embodiment of a portion of a subpixel rendering system.

FIG. 12 shows one embodiment of this approach of computing a weighted average of the results of applying the sharpening filters. In this figure, Rmeta is the meta-sharpening result for red, Rcross in the cross-luma-sharpening result for red. The calculations for green and blue would be similar. However, the calculations for white may require different weighting coefficients than the ones for color—thus, the Wmeta and Wcross values are shown separately. To perform the weighted average for red, an M2_COL register 1202 may be multiplied by the Rmeta value in an M2 MULT unit 1204. Typically, the M2_COL register contains a fixed point binary number that represents a percentage between 0 and 100%. The M2_COL value may be processed by inverter 1208 to produce the "inverse percentage". An inverse percentage is defined here to mean that a percentage and its inverse add up to 100%. For example, if M2_COL contains 75% then the result of inverter 1208 will be 25%. This can be accomplished in one embodiment by subtracting the M2_COL value from 100%, or by simpler means as described below. The Rcross value may be multiplied by this inverse M2_COL value in another M2_MULT 1204, then the results of the two multipliers may be summed together to produce the final R value. The calculation for green and blue would be similar. The calculation for white is very similar; however a different percentage value may be used and this percentage value may be stored in an M2_WHT register 1206.

For merely one example, Table 3 provides the pseudo-code for one embodiment of computing a weighted average of sharpening filter results implemented in software.

TABLE 3

| R = R + math.floor(Rmeta*M2_col/128) + |
| math.floor(Rcross*(128-M2_col)/128) |
| G = G + math.floor(Gmeta*M2_col/128) + |
| math.floor(Gcross*(128-M2_col)/128) |
| B = B + math.floor(Bmeta*M2_col/128) + |
| math.floor(Bcross*(128-M2_col)/128) |
| W = W + math.floor(Wmeta*M2_wht/128) + |
| math.floor(Wcross*(128-M2_wht)/128) |

In this pseudo-code, the fixed point binary representation of 100% is the value 128, so the action of inverters 1208 is accomplished by subtracting from 128. This code also shows the calculation for green and blue, involving the filter results Gmeta, Gcross, Bmeta and Bcross, which are not specifically shown in FIG. 12.

The M2_MULT modules are described above as if they were multipliers. Such an embodiment might require many gates in hardware, as there are 2 of these multipliers for each color and a total of 8 of them. Therefore it may be desirable if these multipliers could be replaced by a simpler circuit. FIG. 12 shows one such embodiment. Instead of a multiplier, this M2_MULT module 1204 shifts the input filter value right by several different amounts and summed by adders into several different combinations. The combinations are selected by a multiplexor 1304. Instead of sending a fixed-point binary percentage value to the M2_INDEX input 1302, an index value may be sent instead to select one of the percentage values. It should also be noted that the index values to the MUX may be chosen so that inverting the bits of the index produces the "inverse probability" described above. This allows the inverter 1208 modules of FIG. 12 to simply invert the bits to generate the inverse probability—resulting in a simpler operation than a subtraction and a decrease in the total number of gates needed to implement.

It should also be noted that not all of the input states of MUX 1304 may be used. In such as case, the extra states may be populated by adding more shifters and adders to produce different percentages that are selected by the unused states of the MUX. A MUX with more or fewer states could be used. The shifters could alternately shift left by different amounts instead of right. This might result in an M2_MULT module with more precision, but would require larger adders and a right shifter after the adders in FIG. 12.

In an adjustable GMA based on the M2 value described above, the value of M2_COL should increase to 100% as the M2 value increases to 1.0, making M2_COL substantially equal to M2. In this range of M2 values, the M2_WHT percentage would remain approximately 100%. When the M2 value is greater than 1.0, the M2_COL value remains approximately 100% while the M2_WHT percentage may decrease from 100% to 0 as the M2 value increases from 1.0 to another value, e.g. 2.0. One formula for calculating M2_WHT for M2 values above 1.0 might be M2_WHT=2−M2. These percentages can be stored as fixed point binary numbers in the hardware, or they can be stored as M2_INDEX 1302 values as described in FIG. 13. Table 4-below shows a list of possible M2 values and the corresponding M2_COL and M2_WHT values that could result.

TABLE 4

| M2_REG | M2 | M2_COL | M2_WHT |
|---|---|---|---|
| 0000 | 0.500 | 11 (50%) | 15 (100%) |
| 0001 | 0.625 | 12 (62.5) | 15 (100) |
| 0010 | 0.750 | 13 (75) | 15 (100) |
| 0011 | 0.875 | 14 (87.5) | 15 (100) |
| 0100 | 1.000 | 15 (100) | 15 (100) |
| 0101 | 1.125 | 15 (100) | 14 (87.5) |
| 0110 | 1.250 | 15 (100) | 13 (75) |
| 0111 | 1.375 | 15 (100) | 12 (62.5) |
| 1000 | 1.500 | 15 (100) | 4 (50) |
| 1001 | 1.625 | 15 (100) | 3 (37.5) |
| 1010 | 1.750 | 15 (100) | 2 (25) |
| 1011 | 2.000 | 15 (100) | 0 (0) |

Figure 13:
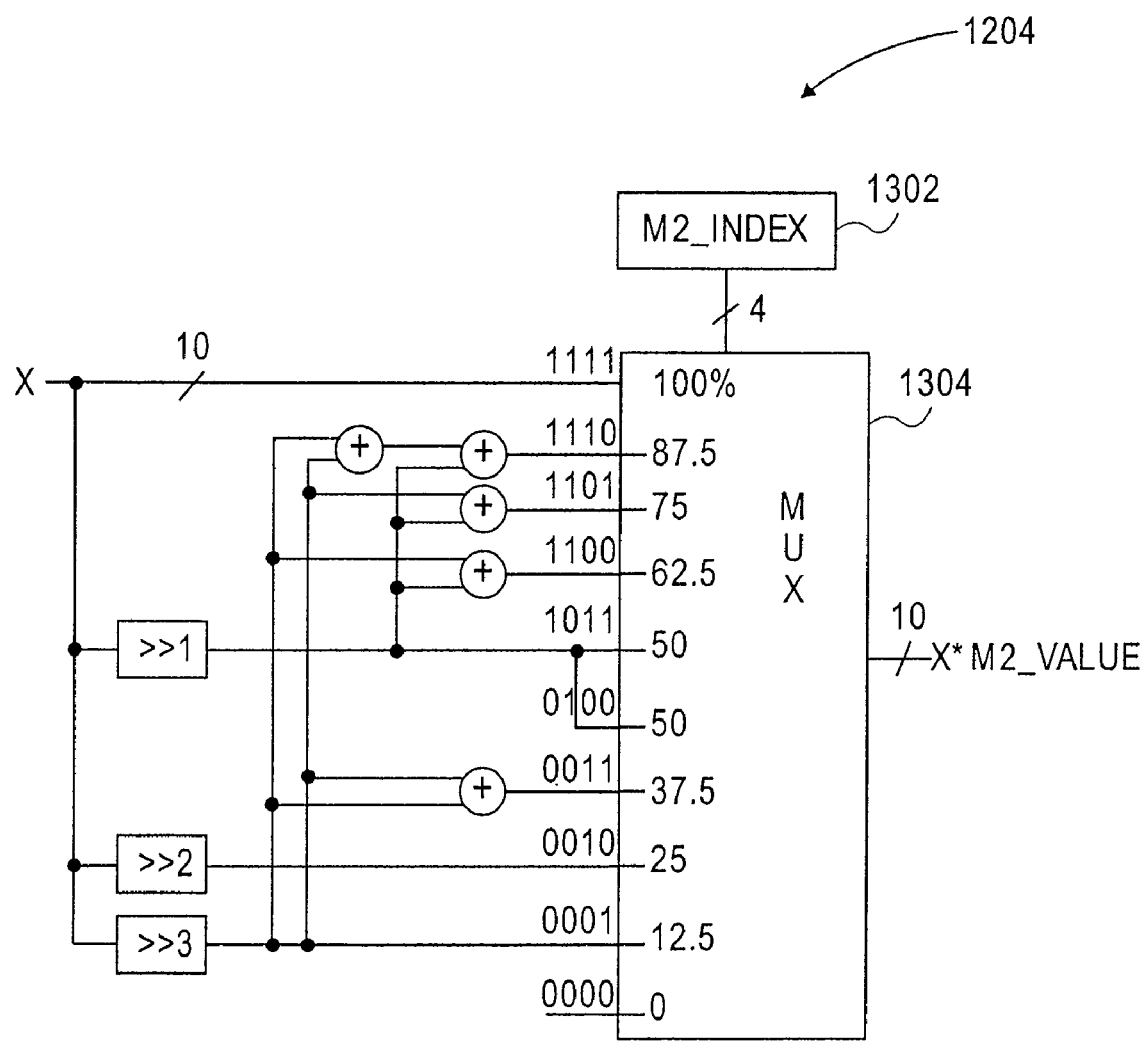
FIG. 13 shows one embodiment of a component of the portion of the subpixel rendering system shown in FIG. 12.

In Table 4, the M2_INDEX values 1302 from FIG. 13 that are shown for M2_COL and M2_WUT could be used in an M2_MULT module 1204. The corresponding percentage that results is shown in parentheses next to the index values.

While the above illustrated embodiments have been described in connection with particular functional units, operations or hardware, the description is not intended to limit a particular implementation and it will be understood by those skilled in the art that these functional units and operations can be implemented using any combination of hardware and/or software. For example, a programmable gate array or like circuitry can be configured to implement such functional blocks. In other examples, a microprocessor operating a program in memory can also implement such functional blocks. Thus, while the techniques and implementations have been described with reference to exemplary embodiments, it will be understood by those skilled in the art that various changes may be made and equivalents may be substituted for elements thereof without departing from the scope of the appended claims. In addition, many modifications may be made to adapt a particular situation or material to the teachings without departing from the essential-scope thereof. Therefore, the particular embodiments, implementations and techniques disclosed herein, some of which indicate the best mode contemplated for carrying out these embodiments, implementations and techniques, are not intended to limit the scope of the appended claims.

What is claimed is:

1. In a display system comprising a display panel substantially comprising a subpixel repeating group with at least four primary colored subpixels, said display system further receiving input image data specified in a first color space and outputting image data specified in a second color space, said display system further comprising:
   a gamut mapping module configured to map said image data specified in said first color space to image data specified in said second color space; said gamut mapping module clamping out-of-gamut colors to black; and
   a calculation unit configured to calculate at least a first primary color value at least partially according to a clamping of the out-of-gamut colors to luminance;
   wherein the first color space comprises at least three colors; and
   wherein the second color space comprises at least four colors, the four colors including at least one color that is not included in the colors of the first color space, and that is calculated at least partially according to a luminance of the input image data.

2. The display system of claim 1 wherein said first color space is RGB and said second color space is RGBW.

3. The display system of claim 2 wherein said at least a first primary color value is W and W is calculated depending upon the luminance of the input image data.

4. The display system of claim 3 wherein W is calculated with one of a group of following formulas, said group comprising:

$$W1=(16*Lrgb-(2*Rw+5*Gw+Bw))/8,$$

$$W1=(12*Lrgb-(2*Rw+5*Gw+Bw))/4 \text{ and}$$

$$W1=(L*M1\_inv-(2*R+5*G+B)*M2\_inv/8)/32.$$

5. In a display system comprising a display panel substantially comprising a subpixel repeating group with at least four primary colored subpixels, said display system further receiving input image data specified in a first color space and outputting image data specified in a second color space, said display system further comprising:
   a gamut mapping module configured to map an input image color value of said input image data specified in said first color space to an image color value specified in said second color space; said gamut mapping module clamping out-of-gamut colors using at least first and second clamping systems, said first and second clamping systems producing first and second clamped values; and
   a weighting module producing a resulting clamped value from said first and said second clamped values; and
   wherein a final output image value is derived from said resulting clamped value.

6. The display system of claim 5 wherein said first clamping system is a clamp-to-black system and second clamping system is a clamp-to-luminance system.

7. The display system of claim 5 wherein said first clamping system is a clamp-to-black system and second clamping system clamp-to-white system.

8. The display system of claim 5 wherein said weighting module produces a fixed percentage of said first and said second clamped values.

9. The display system of claim 5 wherein said weighting module produces an average of said first and said second clamped values.

10. The display system of claim 5 wherein said weighting module produces a weighted average comprising a function of said input image color value.

11. The display system of claim 10 wherein said function of the input image color value is one of a group, said group comprising a function of saturation, a function of brightness and a function of hue of the input image color value.

12. A display system configured to receive input image data specified in a first color space and to output image data specified in a second color space, said display system comprising:
   a display panel substantially comprising a subpixel repeating group with at least four primary colored subpixels that define said second color space;
   a pre-reduction module, said pre-reduction module reducing the values of the input image data; and
   a gamut mapping module accepting said reduced input image data values.

13. The display system of claim 12 wherein said pre-reduction module reduces said input image data values by a fixed percentage.

14. The display system of claim 12 wherein said pre-reduction module reduces said input image data values by a function of the hue of the input image data.

15. The display system of claim 12 wherein said pre-reduction module reduces said input image data values by a function of the brightness of the input image data.

16. The display system of claim 12 wherein said pre-reduction module reduces said input image data values by a function of a combination of the saturation, hue and brightness of the input image data.

17. The display system of claim 12 wherein said pre-reduction module reduces said input image data values by a function of the saturation of the input image data.

18. The display system of claim 17 wherein said function has a value near 1.0 for input image data saturation values near 0 and wherein said function has a value less than 1.0 as input image data saturation values increase.

19. The display system of claim 17 wherein said function comprises a Gaussian curve.

20. The display system of claim 17 wherein said function comprises a straight line.

21. The display system of claim 17 wherein said function comprises a piecewise linear function.

22. The display system of claim 17 wherein said function further comprises a separate function of saturation for each of R, G and B.

23. A display system configured to receive input image data specified in a first color space and configured to output image data specified in a second color space, said display system further comprising:
   a display panel comprising a subpixel repeating group; and
   an adjustable gamut mapping module configured to receive parameters based upon an arrangement of said subpixels in said subpixel repeating group;
   wherein said subpixel repeating group comprises RGBW subpixels and said parameters are based on the ratio of the maximum luminosity of said W subpixel to the sum of the maximum output luminosity of said R, G and B subpixels.

24. The display system of claim 23 where said parameters are loaded into registers in hardware.

25. The display system of claim 23 where said parameters are selected from a LUT.

* * * * *